US011257483B2

(12) United States Patent
Czarnowski et al.

(10) Patent No.: US 11,257,483 B2
(45) Date of Patent: Feb. 22, 2022

(54) ON-DEVICE NEURAL NETWORK ADAPTATION WITH BINARY MASK LEARNING FOR LANGUAGE UNDERSTANDING SYSTEMS

(71) Applicant: Intel Corporation, Santa Clara, CA (US)

(72) Inventors: Krzysztof Czarnowski, Gdansk (PL); Munir Georges, Kehl (DE)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 16/369,926

(22) Filed: Mar. 29, 2019

(65) Prior Publication Data

US 2019/0228763 A1 Jul. 25, 2019

(51) Int. Cl.

| | |
|---|---|
| ***G10L 15/16*** | (2006.01) |
| ***G06N 3/04*** | (2006.01) |
| ***G10L 15/06*** | (2013.01) |
| ***G10L 15/18*** | (2013.01) |
| ***G10L 15/22*** | (2006.01) |
| ***G06N 3/08*** | (2006.01) |
| *G10L 15/26* | (2006.01) |

(52) U.S. Cl.

CPC ................ *G10L 15/16* (2013.01); *G06N 3/04* (2013.01); *G06N 3/084* (2013.01); *G10L 15/063* (2013.01); *G10L 15/1815* (2013.01); *G10L 15/22* (2013.01); *G10L 15/26* (2013.01)

(58) Field of Classification Search

CPC ... G10L 15/16; G10L 15/063; G10L 15/1815; G10L 15/22; G10L 15/26; G06N 3/04; G06N 3/084

See application file for complete search history.

(56) References Cited

U.S. PATENT DOCUMENTS

| | | | | |
|---|---|---|---|---|
| 5,751,904 A * | 5/1998 | Inazumi | .................. | G10L 15/16 704/232 |
| 10,878,320 B2 * | 12/2020 | Wierzynski | .......... | G06K 9/4628 |
| 2018/0300629 A1 * | 10/2018 | Kharaghani | ......... | G06N 3/0472 |
| 2019/0043497 A1 | 2/2019 | Georges | | |
| 2019/0164054 A1 * | 5/2019 | Lee | .......................... | G06F 9/44 |

(Continued)

FOREIGN PATENT DOCUMENTS

WO WO-2018058509 A1 * 4/2018 ............... G06N 3/04

OTHER PUBLICATIONS

Chen et al., "Spoken Language Understanding without Speech Recognition," 2018 IEEE International Conference on Acoustics, Speech and Signal Processing (ICASSP), Calgary, AB, 2018, pp. 6189-6193, doi: 10.1109/ICASSP.2018.8461718 (Year: 2018).*

(Continued)

*Primary Examiner* — Michelle M Koeth

(74) *Attorney, Agent, or Firm* — Essential Patents Group, LLP.

(57) ABSTRACT

Spoken language understanding techniques include training a dynamic neural network mask relative to a static neural network using only post-deployment training data such that the mask zeroes out some of the weights of the static neural network and allows some other weights to pass through and applying a dynamic neural network corresponding to the masked static neural network to input queries to identify outputs for the queries.

23 Claims, 10 Drawing Sheets

(56) References Cited

U.S. PATENT DOCUMENTS

| | | | | |
|---|---|---|---|---|
| 2019/0318246 | A1* | 10/2019 | Chen | G06N 3/04 |
| 2020/0104039 | A1* | 4/2020 | Robertson | G06F 3/0346 |

OTHER PUBLICATIONS

Diehl et al., "Conversion of Artificial Recurrent Neural Networks to Spiking Neural Networks for Low-power Neuromorphic Hardware," Jan. 2016, arXiv:1601.04187v1 [cs.NE] (Year: 2016)*

Mallya, A. et al., "Piggyback: Adding Multiple Tasks to a Single, Fixed Network by Learning to Mask", Technical Report, University of Illinois at Urbana-Champaign, 2018.

* cited by examiner

200

121

| IL-HL1 wts | HL1-HL2 wts | HL2-HL3 wts | HL3-HL4 wts | HL4-HL5 wts | HL5-OL wts |
|---|---|---|---|---|---|
| w1 | w1 | w1 | w1 | w1 | w1 |
| w2 | w2 | w2 | w2 | w2 | w2 |
| w3 | w3 | w3 | w3 | w3 | w3 |
| w4 | w4 | w4 | w4 | w4 | w4 |
| w5 | w5 | w5 | w5 | w5 | w5 |
| w6 | w6 | w6 | w6 | w6 | w6 |
| w7 | w7 | w7 | w7 | w7 | w7 |
| w8 | w8 | w8 | w8 | w8 | w8 |
| w9 | w9 | w9 | w9 | w9 | w9 |
| w10 | w10 | w10 | w10 | w10 | w10 |
| w11 | w11 | w11 | w11 | w11 | w11 |
| w12 | w12 | w12 | w12 | w12 | w12 |
| ⋮ | w13 | w13 | w13 | w13 | w13 |
| | w14 | w14 | w14 | w14 | w14 |
| | w15 | w15 | w15 | w15 | w15 |
| | w16 | w16 | w16 | w16 | w16 |
| | ⋮ | ⋮ | ⋮ | ⋮ | ⋮ |

301 302 303 304 305 306

123

401

402

403

| MASK | | | | | |
|---|---|---|---|---|---|
| 1 | 1 | 1 | 1 | 1 | 0 |
| 1 | 1 | 1 | 1 | 1 | 0 |
| 1 | 0 | 1 | 1 | 0 | 1 |
| 0 | 1 | 1 | 0 | 1 | 1 |
| 1 | 1 | 1 | 1 | 1 | 1 |
| 1 | 1 | 0 | 1 | 0 | 1 |
| 1 | 1 | 1 | 1 | 1 | 1 |
| 1 | 1 | 1 | 1 | 1 | 1 |
| 0 | 0 | 1 | 0 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| ⋮ | 1 | 1 | 0 | 1 | 0 |
| | 0 | 0 | 1 | 1 | 0 |
| | 1 | 1 | 1 | 1 | 1 |
| | 1 | 1 | 0 | 0 | 1 |
| | ⋮ | ⋮ | ⋮ | ⋮ | ⋮ |

| IL-HL1 wts | HL1-HL2 wts | HL2-HL3 wts | HL3-HL4 wts | HL4-HL5 wts | HL5-OL wts |
|---|---|---|---|---|---|
| w1 | w1 | w1 | w1 | w1 | 0 |
| w2 | w2 | w2 | w2 | w2 | 0 |
| w3 | 0 | w3 | w3 | 0 | w3 |
| 0 | w4 | w4 | 0 | w4 | w4 |
| w5 | w5 | w5 | w5 | w5 | w5 |
| w6 | w6 | 0 | w6 | 0 | w6 |
| w7 | w7 | w7 | w7 | w7 | w7 |
| w8 | w8 | w8 | w8 | w8 | w8 |
| 0 | 0 | w9 | 0 | w9 | w9 |
| w10 | w10 | w10 | w10 | w10 | w10 |
| w11 | w11 | w11 | w11 | w11 | w11 |
| w12 | w12 | w12 | w12 | w12 | w12 |
| ⋮ | w13 | w13 | 0 | w13 | 0 |
| | 0 | 0 | w14 | w14 | 0 |
| | w15 | w15 | w15 | w15 | w15 |
| | w16 | w16 | 0 | 0 | w16 |
| | ⋮ | ⋮ | ⋮ | ⋮ | ⋮ |

| IL-HL1 Init | HL1-HL2 Init | HL2-HL3 Init | HL3-HL4 Init | HL4-HL5 Init | HL5-OL Init |
|---|---|---|---|---|---|
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| 0.5 | 0.5 | 0.5 | 0.5 | 0.5 | 0.5 |
| ⋮ | 0.5 | 0.5 | 0.5 | 0.5 | 0.5 |
| | 0.5 | 0.5 | 0.5 | 0.5 | 0.5 |
| | 0.5 | 0.5 | 0.5 | 0.5 | 0.5 |
| | 0.5 | 0.5 | 0.5 | 0.5 | 0.5 |
| | ⋮ | ⋮ | ⋮ | ⋮ | ⋮ |

ON-DEVICE NEURAL NETWORK ADAPTATION WITH BINARY MASK LEARNING FOR LANGUAGE UNDERSTANDING SYSTEMS

BACKGROUND

Spoken language understanding systems generally translate audio voice queries into machine-understandable user intentions, which can then be acted upon by the given computing platform. These systems may use neural network models for speech recognition and language understanding, for example. Such systems, in the context of most implementations, are typically constrained in terms of available memory, computation, power etc. The implemented models are trained on training data, however, application in the real world may reveal the limitations of such training. For example, among a variety of other factors, the acoustic environment does not match the training environment and/or the acoustic environment changes over time. It is with respect to these and other considerations that the present improvements have been needed. Such improvements may become critical as the desire to implement on-device spoken language understanding systems becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 4 illustrates an exemplary dynamic NN classifier mask;

FIG. 5 illustrates an exemplary resultant dynamic neural network weights for implementation as a dynamic neural network by dynamic NN classifier;

DETAILED DESCRIPTION

Figure 1:
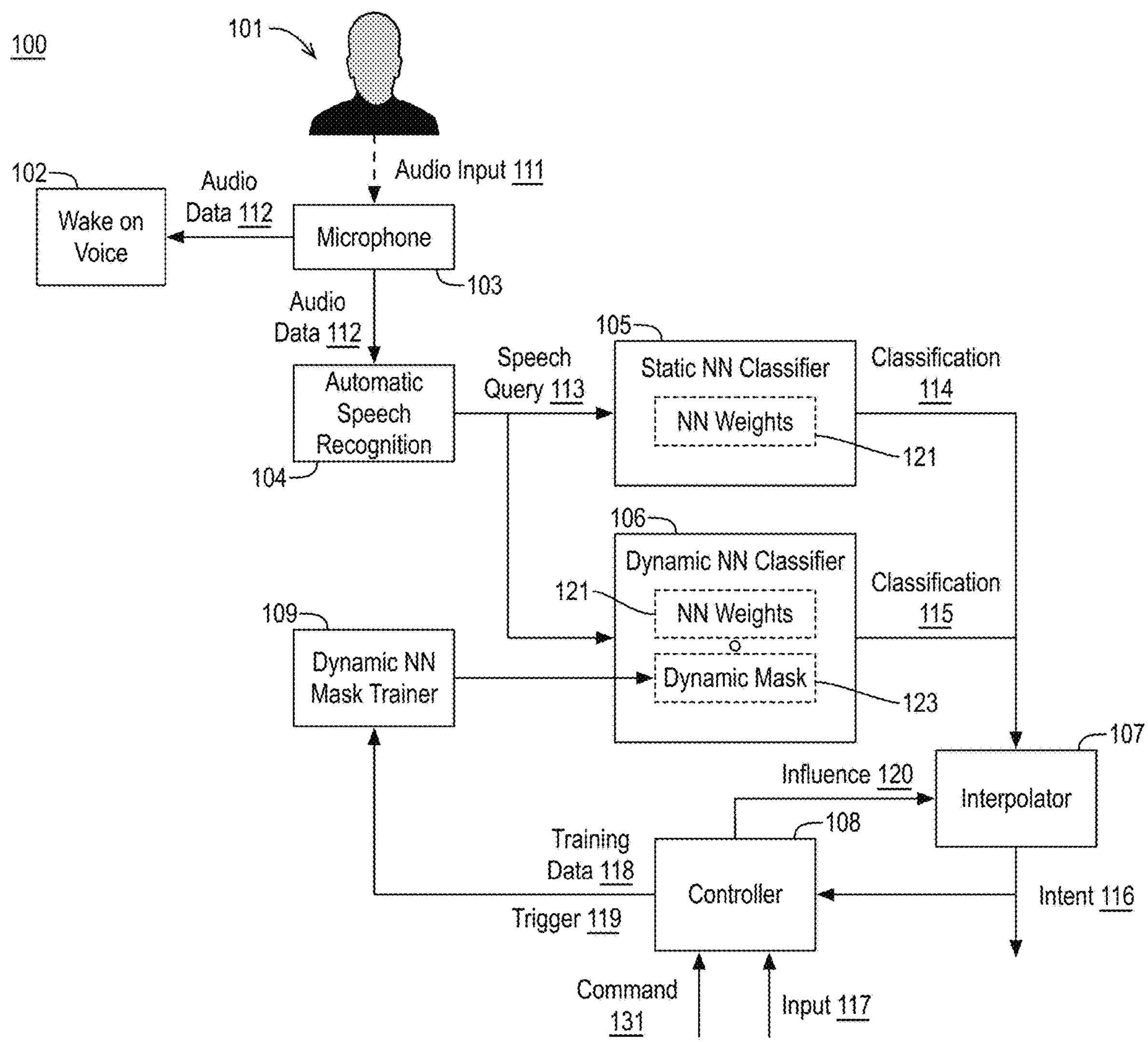
FIG. 1 is an illustrative diagram of an example system for implementing neural network adaption with mask training for language understanding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to on device neural network adaptation and, in particular, to training and storing a dynamic mask for a static neural network.

As discussed above, implemented neural network models are typically trained on training data, however, application in the real world may reveal the limitations of such training. The techniques discussed herein address such shortcomings and adapt to the real world implementation. Such techniques may address, for example, among a variety of other factors, the acoustic environment during implementation not matching the training environment, the acoustic environment changing over time (e.g., different background noises, different reverberation characteristics etc.), the accommodation of different speakers, the voices of the speaker depending on their gender and/or other characteristics (e.g., male/female, age, residence, health, etc.) as well as their mood (e.g., lovely, angry, normal, etc.). Furthermore, the discussed techniques may adapt to changing channels (e.g., microphone changes such as between a laptop microphone and a head-set microphone, etc.), and transmission changes (Bluetooth, USB, LT, GSM, etc.). The techniques address such changes and others and thereby provide a general framework for neural network model adaptation.

Furthermore, spoken language understanding systems may translate audio voice queries to user intentions that are acted upon by the computing device or platform, which, particularly in edge (e.g., internet of things, IOT) devices have limited resources in terms of available memory and compute. It is noted that here, language understanding generally refers to spoken language understanding (e.g., language understanding based on audio data). Such devices may implement neural network models that translate input queries into user intents. As used herein, the term input query includes any data structure representative of audio input data and formatted for evaluation by a neural network for determination of a user intent. For example, an input query may be a bag of words (BOW) or a continuous word embedding feature vector including a vector of words identified in audio data and the number of occurrences of each of the words. For example, for the sentence "John likes to watch movies, however John likes to watch soccer more", the resultant input query may be {"John":2, "likes":2, "to": 2, "watch":2, "movies":1, "however":1, "soccer":2, "more": 1}. As used herein, the terms intent and user intent may be any result or classification from a neural network or from an interpolation of multiple neural networks that indicates a most likely intent corresponding to the input query or multiple most likely intents corresponding to the input query and/or likelihood scores for the resultant user intent(s), or any data structure corresponding thereto. In the most simple form, an intent may be a device action such as "open e-mail" or "turn on all lights", etc.

In some embodiments, an input speech query is evaluated by a static neural network language classifier to generate a first intent classification by applying pre-trained weights of the static neural network language classifier such that the pre-trained weights were trained using pre-deployment training data that is unavailable at the device. That is, the static neural network language classifier may be pre-trained (in a training phase) on a large training set of data to determine weights of the static neural network language classifier as well as other features of the static neural network language classifier, which are determined using data that is then unavailable at the device during the implementation phase. As used herein, the term static neural network language classifier indicates a classifier that implements a neural network that is not changed during the implementation phase and is, therefore, static. As used herein, the term language classifier indicates determining an intent of a user from a voice query (e.g., identifying an intent of "turn a light on" relative to a voice query "I cannot see anything, it's too dark").

Notably, it may be desirable to generate a dynamic neural network language classifier that is trained using post-deployment training data attained at the device. For example, it may be desirable to adapt the static neural network language classifier (e.g., an underlying neuronal model) by making use of full-fidelity data that is attained and available only after deployment on a device. For example, in the case of neural network based spoken language recognition and understanding appliances, adaptation to specific acoustic environments and speakers is desirable as it often results in better performance as compared to the static neural network language classifier. Furthermore, it is desirable to maintain the original static neural network language classifier to support rollback or arbitration between the static neural network language classifier and the neural network language classifier generated on the device. Embodiments discussed herein address such concerns by generating a dynamic neural network language classifier mask that masks (e.g., makes some weights zero and passes through others unchanged) the pre-trained weights of the static neural network language classifier. Such techniques provide for a dynamic neural network language classifier that may be used in place or along with the static neural network language classifier. Furthermore, since the mask may be binary, it has a small memory footprint as compared to storing a second neural network language classifier. Thereby, an adaptive and small memory footprint neural network language classifier is provided. Such techniques are scalable if more models are needed and/or if more adaptation techniques are used. Such techniques may be particularly advantageous for environments and speaker adaptive spoken language understanding systems implemented on edge devices.

In some embodiments, a dynamic neural network language classifier mask is trained using post-deployment training data attained at the device such that the mask includes mask indicators to set corresponding pre-trained weights of the static neural network language classifier. Post-deployment training data may include any suitable data format such as combinations of input queries and known or expected intents corresponding thereto (e.g., corresponding input queries and intents known to be desirable or undesirable to the user). As used herein, post-deployment training data indicates training data attained at the device and therefore unavailable in the training phase. The trained dynamic neural network language classifier mask is then applied to the static neural network language classifier to generate a dynamic neural network language classifier such that the dynamic neural network language classifier includes zero weights corresponding to particular indicators (0s) and weights matching the pre-trained weights for other indicators (1s) of the mask. For example, the mask may be a binary with indicators (e.g., 1s) that indicate the weight corresponding thereto is to be used unchanged and other indicators (e.g., 0s) that indicate the weight corresponding thereto is to be zeroed out. The dynamic neural network language classifier is then applied to the same input speech query to generate a second intent classification thereof and the first and second intent classifications may be used (e.g., interpolated) to determine a resultant user intent or classification. The resultant user intent or classification may then be used to initiate an action by the device, stored to memory for later use, etc.

Although illustrated and discussed herein with respect to neural network language classifiers for the sake of clarity of presentation, the techniques discussed herein may be implemented using any static neural networks, dynamic neural networks, and dynamic neural network mask, etc. that may be applied to any input queries to generate any neural network outputs, etc. in any context.

FIG. 1 is an illustrative diagram of an example system 100 for implementing neural network adaption with mask training for language understanding, arranged in accordance with at least some implementations of the present disclosure. As shown in FIG. 1, system 100 may interact with a user 101 and may include a wake on voice module 102, a microphone 103, an automatic speech recognition module 104, a static neural network (NN) classifier 105, a dynamic NN classifier 106, an interpolator 107, a controller 108, and a dynamic NN mask trainer 109.

For example, system 100 may be provided in an environment that includes user 101 providing audio input 111 to system 100. System 100 may be in a deep sleep or power saving mode or the like and user 101 may be attempting to wake system 100 or user 101 may be interacting with system 100 after it has been woken. When user 101 provides audio input 111 that is identified as a key phrase of system 100, via wake on voice module 102, system 100 may wake, perform a task, etc. For example, system 100 may provide an automatic wake on voice, speech recognition, language understanding, and other capabilities for user 101. System 100 may be implemented in any suitable device such as a computer, a laptop, an ultrabook, a smartphone, a tablet, a phablet, a wearable device such as a smart watch or eye glasses, etc. In any case, system 100 may be described as a computing device, platform, or system as used herein.

As shown, user 101 may provide audio input 111 in an attempt to wake or interact with system 100. As will be appreciated, system 100 may also receive as audio input background noise, silence, background speech, and speech not intended to attain access to system 100. For example, system 100 may need to classify audio (e.g., audio input 111 or other audio) as including particular words and phrases and/or to use the audio to indicate an intent 116 of the user. As discussed, the term intent may include any result or classification from a neural network or from an interpolation of multiple neural networks such as classifications (indicating action to be taken, a device command, etc.), scores (indicating likelihood(s) of such actions or commands), or the like. Intent 116 may include any data structure indicative of such identified actions or commands. For example, intent 116 may be an intended operation of system 100 or a command of an intended operation to be issued by system 100.

Microphone 103 receives audio input 111 from user 101 (or multiple users or an environment or the like). In some examples, audio input 111 is issued by user 101 to wake system 100 and/or to have system 100 perform an operation. Audio input 111 may be characterized as audio, input audio, input speech stream, etc. Microphone 103 receives audio input 111 (e.g., as sound waves in the air) and converts audio input 111 to an electrical signal such as a digital signal to generate audio data 112. Wake on voice module 102 may operate (e.g., via a DSP) even in a deep sleep mode of system 100 to continuously monitor audio data 112.

Upon detection of a voice or other sound that requires further evaluation by system 100, wake on voice module 102 may provide an initiation signal that may activate the other modules of system 100 to provide language understanding operations.

Automatic speech recognition module 104 receives audio data 112 from microphone 103, from a memory, or another device and automatic speech recognition module 104 generates input speech query 113 associated with at least a portion of audio data 112. Input speech query 113 may include suitable features or feature vectors or the like representing identified speech in audio data 112. For example, input speech query 113 may be a bag of words feature vector as discussed above, although any suitable data format may be used.

As shown, speech query 113 is provided to static NN classifier 105 that implements stored NN weights 121 (and other features of the NN) to generate an intent classification 114. For example, static NN classifier 105 applies a pre-trained neural network to speech query 113 (e.g., a feature vector) to generate intent classification 114. Intent classification 114 includes any suitable data structure representative of one or more intents and corresponding likelihoods of the intent. For example, for a given speech query (SQ) static NN classifier 105 may output any number of Intents (I1, I2, I3, . . . ) and corresponding probabilities (P1, P2, P3, . . . ) such that static NN classifier 105 provides a plurality of probabilities Px(Ix|SQ) for x=1, 2, 3, . . . that may be read as Px is the probability the intent is Ix for given speech query SQ.

As discussed, static NN classifier 105 implements stored NN weights 121. NN weights 121 are stored in memory and are unchanged at system 100 during implementation. Notably, NN weights 121 were pre-trained with pre-deployment training data that is now unavailable to system 100 during implementation.

Figures 2, 3:
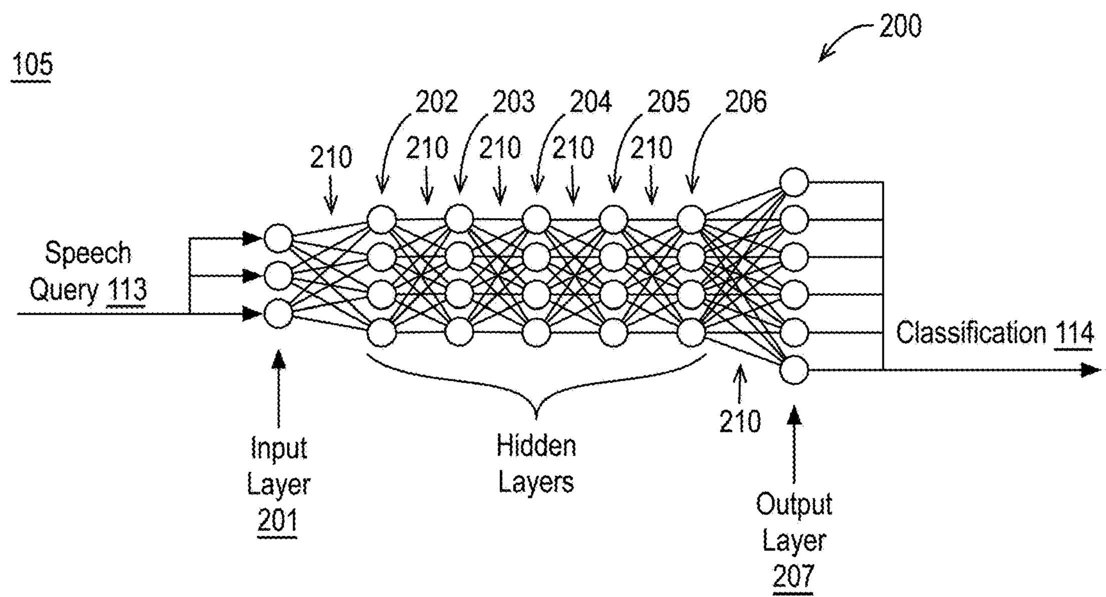
FIG. 2 illustrates an example static pre-trained neural network.
FIG. 3 illustrates exemplary pre-trained neural network weights of a neural network.

FIG. 2 illustrates an example static pre-trained neural network 200, arranged in accordance with at least some implementations of the present disclosure. For example, static pre-trained neural network 200 may be implemented via static NN classifier 105. Neural network 200 may include any suitable neural network such as a multilayer perceptron neural network, a feed forward neural network, a recurrent neuronal network, a convolutional neuronal network, or a radial based feed forward neural network. As shown in FIG. 2, neural network 200 may include an input layer 201, hidden layers 202-206, and an output layer 207. Neural network 200 is illustrated as having three input nodes, hidden layers with four nodes each, and six output nodes for the sake of clarity of presentation, however, neural network 200 may include any number of such input, hidden, and output nodes. Input layer 201 may include any suitable number of nodes such as a number of nodes equal to the number of elements in each of speech queries 113.

Furthermore, as in the illustrated example, neural network 200 may include five hidden layers 202-206. However, neural network 200 may include any number of hidden layers having any number of nodes such as tens, hundreds, or more nodes with each of hidden layers 202-206 having the same or different numbers of nodes. Output layer 207 may include any suitable number of nodes such that classification 114 may include values corresponding to any number of available intents. As discussed, in implementation, static NN classifier 105 may output any number of probability scores and classifications of classification 114. Between the illustrated nodes (or neurons) are lines that represent synapses 210 between the nodes. In some embodiments, synapses 210 take the inputs for a node and multiply them by corresponding weights, although other neural network architectures are possible. The nodes then apply activation functions and pass on the resulting value to later layers of the neural network.

FIG. 3 illustrates exemplary pre-trained neural network weights 121 of neural network 200, arranged in accordance with at least some implementations of the present disclosure. As shown, connecting input layer 201 (IL) and hidden layer 202 (first hidden layer, HL1) are a first set of weights 301 (IL-HL1 wts) labeled generally as w1-w12. Notably, each of weights 301 may connect a node of input layer 201 to a node of hidden layer 202. Furthermore, pre-trained neural network weights 121 include weights 302, again labeled generally, that connect hidden layer 202 (HL1) to hidden layer 203 (second hidden layer, HL2), weights 303 that connect hidden layer 203 (HL2) to hidden layer 204 (third hidden layer, HL3), weights 304 that connect hidden layer 204 (HL3) to hidden layer 205 (fourth hidden layer, HL4), weights 305 that connect hidden layer 205 (HL4) to hidden layer 206 (fifth hidden layer, HL5), and weights 306 that connect hidden layer 206 (HL5) to output layer 207 (OL). Collectively, weights 301, 302, 303, 304, 305, 306 make up pre-trained neural network weights 121. As discussed, such weights are stored in memory at system 100 and are not changed in implementation.

Returning to FIG. 1, speech query 113 is also provided to dynamic NN classifier 106, which uses stored NN weights 121 and a dynamic NN classifier mask 123 to generate a dynamic NN classifier, which is then applied to speech query 113 to determine an intent classification 115. The implementation phase training of dynamic NN classifier mask 123 is discussed further herein below. Dynamic NN classifier 106 may apply dynamic NN classifier mask 123 using any suitable technique or techniques. In an embodiment, stored NN weights 121 and dynamic NN classifier mask 123 are multiplied in an element by element manner to generate a dynamic NN classifier, which is then applied to speech query 113 to generate intent classification 115. As with intent classification 114, intent classification 115 includes any suitable data structure representative of one or more intents and corresponding likelihoods of the intent.

For example, if static NN classifier 105 applies a static neural network having pre-trained weights denoted as M (e.g., a based neural model installed on system 100), to adapt the model in the implementation phase at system 100, a binary mask, $S_a$, for the M weights is trained and adapted (as discussed further herein below). Dynamic NN classifier 106 then generates a dynamic neural network having weights denoted as $M_a$ by applying the binary mask, $S_a$, to the static neural network model, M, such that $M_a=S_a \cdot M$, where $\cdot$ indicates an element by element masking (e.g., an element by element multiplication). Thereby, for adaptation of the pre-trained model to generate a dynamic model trained in the implementation phase, only the small binary mask, $S_a$, must be stored in addition to the base static neural network model, M, resulting in storage, memory, and computational optimization.

FIG. 4 illustrates an exemplary dynamic NN classifier mask 123, arranged in accordance with at least some implementations of the present disclosure. As shown in FIG. 4, dynamic NN classifier mask 123 has a structure corresponding to that of pre-trained neural network weights 121 of static pre-trained neural network 200. Notably, dynamic NN classifier mask 123 has a mask indicator 401 for each of pre-trained neural network weights 121. In the illustrated embodiment, dynamic NN classifier mask 123 is a binary mask such that mask indicators 401 may have a value of 1 or 0 corresponding to weight pass-through indicators 402 (e.g., mask indicators 401 having values of 1) and weight zeroing indicators 403 (e.g., mask indicators 401 having values of 0).

Although illustrated with respect to a binary mask having values that either pass through a corresponding pre-trained neural network weights or zero out corresponding pre-trained neural network weights, dynamic NN classifier mask 123 may include other data structures. In an embodiment, a binary mask may have indicator values of 1 that indicate each corresponding weight is to be multiplied by a first value and indicator values of 0 that indicate each corresponding weight is to be multiplied by a second value less than the first value. For example, the first value may be in the range of 0.8 to 0.9, inclusive, and the second value may be in the range of 0.1 to 0.2, inclusive. Such techniques may take longer to implement at run time but may cause less stark differences between the static and dynamic models and/or slower training changes to the dynamic model.

In some embodiments, dynamic NN classifier mask 123 may be implemented as a mask having four different available mask values (as opposed to two in the binary example). In an embodiment, a first value (e.g., 00) may indicate the corresponding pre-trained weight is to be zeroed out, a second value (e.g., 01) may indicate the corresponding pre-trained weight is to be multiplied by a first value, third value (e.g., 10) may indicate the corresponding pre-trained weight is to be multiplied by a second value greater than the first value, and a forth value (e.g., 11) may indicate the corresponding pre-trained weight is to be passed through unchanged. For example, the first value may be in the range of 0.3 to 0.4, inclusive, and the second value may be in the range of 0.6 to 0.7, inclusive. Such techniques may again offer advantages such as model granularity at the cost of slower run-time implementation.

In any event, mask indicators 401 themselves or values corresponding thereto may be used to mask (e.g., using element wise multiplication techniques) pre-trained neural network weights 121 of static pre-trained neural network 200 to generate a dynamic neural network for implementation by dynamic NN classifier 106 as discussed herein.

FIG. 5 illustrates an exemplary resultant dynamic neural network weights 500 for implementation as a dynamic neural network by dynamic NN classifier 106, arranged in accordance with at least some implementations of the present disclosure. As shown in FIG. 5, dynamic neural network weights 500 include a set of weights 501 connecting input layer 201 (IL) and hidden layer 202 (HL1), a set of weights 502 connecting hidden layer 202 (HL1) and hidden layer 203 (HL2), a set of weights 503 connecting hidden layer 203 (HL2) and hidden layer 204 (HL3), a set of weights 504 connecting hidden layer 204 (HL3) and hidden layer 205 (HL4), a set of weights 505 connecting hidden layer 205 (HL4) and hidden layer 206 (HL5), and a set of weights 506 connecting hidden layer 206 (HL5) and output layer 207 (OL). Collectively, weights 501, 502, 503, 504, 505, 506 make up resultant dynamic neural network weights 500.

Dynamic neural network weights 500 are generated by the element-by-element combining (e.g., multiplication) of pre-trained neural network weights 121 and dynamic NN classifier mask 123 (e.g., in analogy to a Hadamard matrix product). Notably, with reference to FIGS. 3 and 4, those pre-trained neural network weights 121 corresponding to weight pass-through indicators 402 (e.g., mask indicators 401 having values of 1) are passed through and become a part of dynamic neural network weights 500, as illustrated with respect to neural network weight 511. Furthermore, those pre-trained neural network weights 121 corresponding to weight zeroing indicators 403 (e.g., mask indicators 401 having values of 0) are zeroed out and are zeroes in dynamic neural network weights 500, as illustrated with respect to neural network weight 512. Notably, when non-binary masks are used or when a binary mask indicates multiplication by values other than 0 and 1, the resultant values in dynamic neural network weights 500 will be the element-by-element multiplication of pre-trained neural network weights 121 and the pertinent relative value.

With reference to FIG. 1, as discussed, dynamic NN classifier 106 generates a dynamic neural network including, for example, dynamic neural network weights 500, and dynamic NN classifier 106 applies the dynamic neural network to speech query 113 to determine an intent classification 115. The implementation phase training of dynamic NN classifier mask 123 is discussed further herein below. Dynamic NN classifier 106 may apply dynamic NN classifier mask 123 using any suitable technique or techniques. In an embodiment, stored NN weights 121 and dynamic NN classifier mask 123 are multiplied in an element by element manner to generate a dynamic NN classifier, which is then applied to speech query 113 to generate intent classification 115. In an embodiment, the dynamic NN classifier and the static NN classifier are implemented at least partially congruently. As with intent classification 114, intent classification 115 includes any suitable data structure representative of one or more intents and corresponding likelihoods of the intent.

Figure 6:
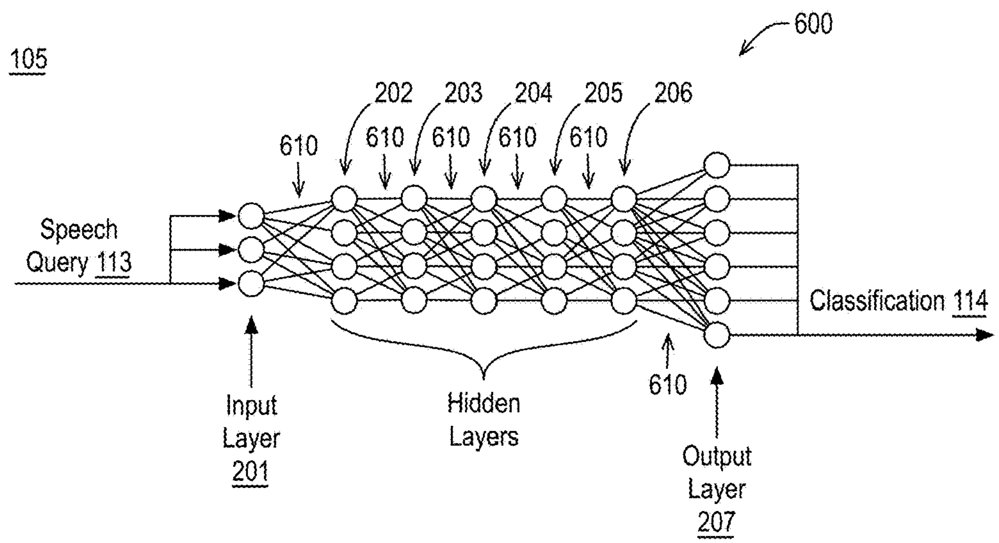
FIG. 6 illustrates an example dynamic neural network.

FIG. 6 illustrates an example dynamic neural network 600, arranged in accordance with at least some implementations of the present disclosure. For example, a dynamic neural network 600 may be implemented via dynamic NN classifier 106. Neural network 600 shares attributes of neural network 200 including the number of and number of nodes of input layer 201, hidden layers 202-206, and output layer 207, as well as the activation functions and parameters thereof implement at the nodes. Notably, dynamic neural network 600 differs from neural network 200 in that some of synapses 610 have been modified by the implementation of dynamic NN classifier mask 123. In the illustrated embodiment, the weights of some of synapses 610 have been zeroed out (essentially breaking the connection between nodes) as indicated by some of synapses 610 being deleted with respect to synapses 210. The remaining synapses 610 may have the same weight values in binary mask implementations as discussed herein. In other embodiments, the weights of remaining synapses 610 may be modified by a multiplication factor as discussed above.

Returning to FIG. 1, intent classifications 114, 115 are provided to interpolator 107, which may interpolate the results of intent classifications 114, 115 and provide a final resultant intent 116. Interpolator 107 may generate final resultant intent 116 based on intent classifications 114, 115 using any suitable technique or techniques. In an embodiment, final resultant intent 116 is a linear interpolation of intent classifications 114, 115 (e.g., $P_{final}$(intent|speech query)=$\lambda P_{static}$(intent|speech query)+$(1-\lambda)P_{dynamic}$(intent|speech query) where speech query is speech query 113, $P_{final}$ is resultant intent 116, $P_{static}$ is intent classification 114, $P_{dynamic}$ is intent classification 115, and $\lambda$ is an influence weight that may be adjusted to provide greater emphasis to either $P_{static}$ or $P_{dynamic}$ and may be used to avoid over-fitting or to reset the system). As shown, intent 116 may be provided to controller 108 and/or memory or another device. In an embodiment, controller 108 uses intent 116 to generate a command 131 for implementation by system 131. For example, command 131 may provide a signal to turn off lights, open an email application, play a song, etc.

In the illustrated embodiment, intent classifications 114, 115 are interpolated to generate final resultant intent 116. In other embodiments, no interpolation may be performed and intent classification 115 may be used as a final intent. In some embodiments, additional dynamic NN masks and models may be implemented by dynamic NN classifier 106 or another dynamic NN classifier and the resultant intent classifications may be included in the interpolation and/or switched on/off depending on the expected user 101 of system 100, the environment of system 100, or other meta data attained by system 100.

In some embodiments, intent classifications 114, 115 and final resultant intent 116 may be tracked and evaluated over time and, when intent classification 115 shows greater accuracy than final resultant intent 116, system 100 may use intent classification 115 in place of final resultant intent 116. For example, controller 108 may determine whether final resultant intent 116 and/or intent classifications 114, 115 are the expected correct intent of user 101 by evaluating subsequent actions by the user. For example, if final resultant intent 116 results in controller 108 issuing command 131 that is carried out without interruption by user 101, the corresponding final resultant intent 116 and/or intent classifications 114, 115 may be characterized as correct for the corresponding speech query 113. However, if command 131 is carried out and then immediately contradicted, as indicated by input 117, by user 101, then the corresponding final resultant intent 116 and/or intent classifications 114, 115 may be characterized as incorrect for the corresponding speech query 113. Input 117 may be any input such as a signal user 101 pressed a button to close the application, a contradictory intent (e.g., "stop", "turn off lights" in response to lights turning on, etc.), or the like.

Such performance may be tracked over time by controller 108 and used for a variety of purposes. In an embodiment, controller 108 selects one of intent classifications 114, 115 or final resultant intent 116 for implementation at all times or for implementation in certain environments or times based on the tracked performance. For example, when the tracked data indicate one of intent classifications 114, 115 or final resultant intent 116 are more accurate, controller 108 may implement the more accurate one at the matched times or environments (as indicated by location, identified user 101, etc.) In some embodiments, controller 108 adjusts influence weight ($\lambda$) to change the influence of intent classifications 114, 115 in certain environments or times based on the tracked performance. For example, when one of intent classifications 114, 115 is more accurate controller 108 may implement the more accurate one at the matched times or environments (likewise as indicated by location, identified user 101, etc.). As used herein the term tracked performance may be any data structure that tracks corresponding speech queries, intent classifications 114, 115, final resultant intent 116, detected result accuracy, and metadata such as time, user identification, location, environment (office, car, etc.).

In some embodiments, controller 108 monitors the tracked performance to trigger training of the dynamic NN mask as indicated by dynamic neural network language classifier mask training trigger 119. Other factors may also be used to generate trigger 119. In some embodiments, trigger 119 is generated by controller 108 based on one or more of a duration since a last training, a number of false input speech query classifications since the last training (e.g., as determined using the discussed tracked performance), or a number of post-deployment training data instances attained since the last training. For example, the duration may be set to trigger training daily or weekly when system 100 is first deployed and at longer intervals thereafter. The number of false input speech query classifications since the last training may be monitored using the tracked performance and may be used to provide trigger 119 when a threshold number of instances occurs or when a rolling average failure rate is above a threshold. The number of post-deployment training data instances attained since the last training may also be monitored and used to provide trigger 119 when the number (either true or false results) exceeds a threshold. As used herein, a training data instance is a combination of a particular speech query and the corresponding data as discussed above.

When trigger 119 is issued to dynamic NN mask trainer 109, dynamic NN mask trainer 109 also receives training data 118 from controller 108, from a memory of system 100, etc. Notably, training data 118 is post-deployment data attained at system 100 during implementation thereof and therefore training data 118 was not available for the training of NN weights 121, which were likewise trained without the availability of training data 118 during a static NN training phase performed prior to deployment of system 100. Training data 118 may include any suitable NN training data such as the tracked performance data discussed above. In an embodiment, training data 118 includes speech queries and corresponding "known" positive or negative user intents. Such user intents are presumed to be known, as discussed, based on the subsequent activity of user 101 and are therefore presumed to be accurate for training purposes. It is also noted that true positive intents may be detected based on subsequent actions by user 101 such as user 101 issuing a command that provides a negative result and then the user halting the corresponding command and issuing a presumably accurate command using another input of system 100.

Dynamic NN mask trainer 109 receives training data 118 and generates or trains a first instance or updated dynamic mask 123, which may have any characteristics discussed herein. Dynamic NN mask trainer 109 may train dynamic mask 123 using any suitable technique or techniques such as back propagation based on loss gradients derived with respect to values dynamic mask 123.

Figure 7:
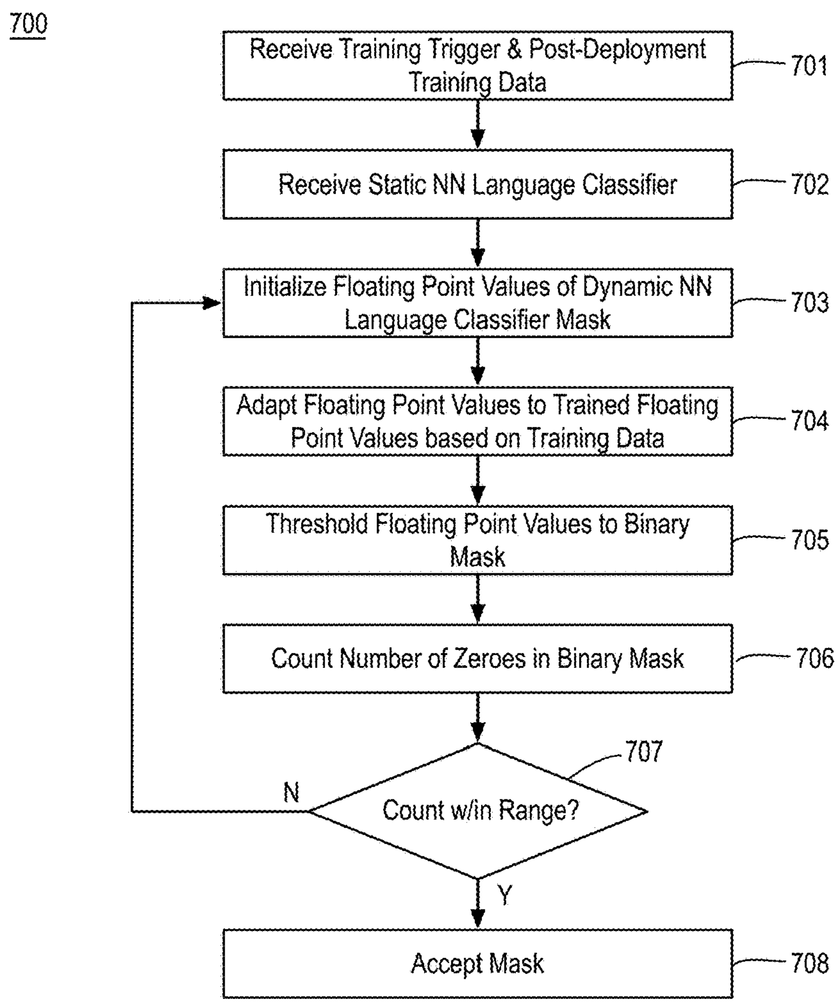
FIG. 7 illustrates an example process for training a dynamic NN classifier mask.

FIG. 7 illustrates an example process 700 for training dynamic NN classifier mask 123, arranged in accordance with at least some implementations of the present disclosure. Process 700 may include one or more operations 701-708 as illustrated in FIG. 7. Process 700 or portions thereof may be performed by any system or device discussed herein, such as dynamic NN mask trainer 109 of system 100, to provide a dynamic NN classifier mask. Process 700 or portions thereof may be repeated any number of times in response to triggers to perform dynamic NN classifier mask training.

Process 700 begins at operation 701, where a training trigger and post-deployment training data are received. For example, training trigger 119 may be received in response to one or more of a duration since a last training, a number of false input speech query classifications since the last training, or a number of post-deployment training data instances attained since the last training and training of the dynamic neural network language classifier mask may be in response to the trigger. The post-deployment training data may include input speech queries and corresponding known classifications or user intent both attained at the device performing process 700. Notably, post-deployment training data is contrasted with pre-training data (or pre-deployment training) unavailable at the device performing process 700.

Processing continues at operation 702, where a static NN language classifier is received. The static NN language classifier may be stored at the device performing process 700 and may include any static NN language classifier discussed herein. For example, the static NN language classifier may be characterized as model M herein.

Processing continues at operation 703, where values of the dynamic NN classifier mask are initialized with floating point values. As used herein, the term floating point value indicates an approximation of a real number to a particular precision and may be contrasted with a binary value or four value mask values that resultant floating point values will be thresholded to in process 700. The dynamic NN classifier mask may be initialized with floating point values using any suitable technique or techniques. In an embodiment, each floating point value of the dynamic NN classifier mask is initialized to the same value. In an embodiment, each floating point value of the dynamic NN classifier mask is initialized to a randomized value within a particular range. In an embodiment, each floating point value of the dynamic NN classifier mask is initialized to a randomized value within a range of 0.15 to 0.85, inclusive. Such techniques may advantageously provide for initial randomized values for training that are not too heavily weighted toward a resultant thresholded value. In an embodiment, each floating point value of the dynamic NN classifier mask is initialized to a value that is proportional to its corresponding static weight. For example, the corresponding static weight may be translated to multiple bins (e.g., bins of 0 to 0.2, 0.2 to 0.4, 0.4 to 0.6, 0.6 to 0.8, and 0.8 to 1) linearly based on the corresponding static weight.

Figures 8, 9:
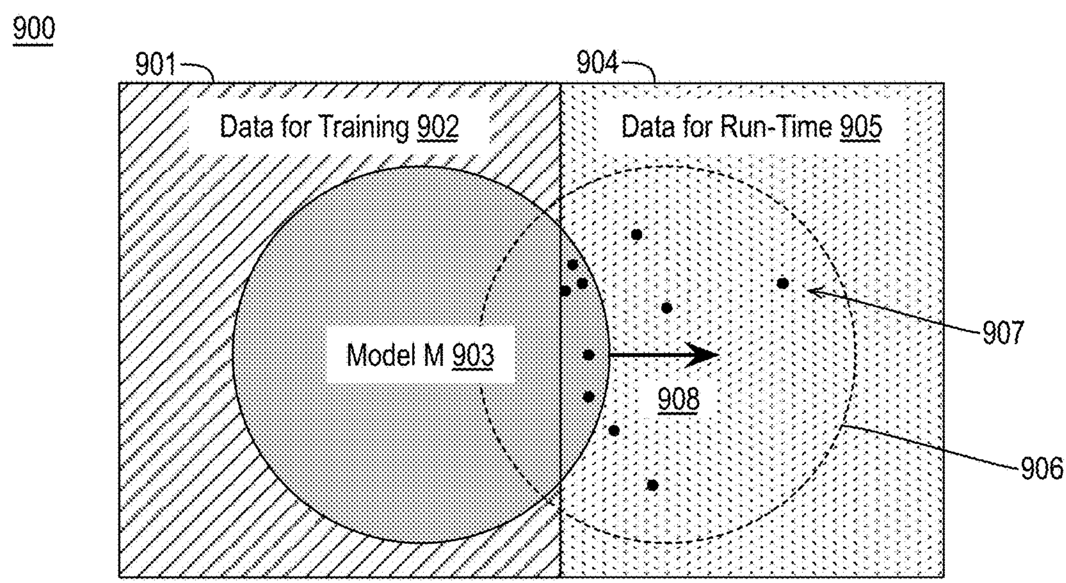
FIG. 8 illustrates an exemplary dynamic NN classifier mask initialization for dynamic NN classifier mask training.
FIG. 9 illustrates exemplary pre-deployment and post-deployment training environments.

FIG. 8 illustrates an exemplary dynamic NN classifier mask initialization for dynamic NN classifier mask training, arranged in accordance with at least some implementations of the present disclosure. As shown in FIG. 8, initialized dynamic NN classifier mask 800 has a structure corresponding to that of pre-trained neural network weights 121 of static pre-trained neural network 200. As discussed with respect to FIG. 4, initialized dynamic NN classifier mask 800 has an initialized mask weight 801 for each of pre-trained neural network weights 121. In the illustrated embodiment, initialized dynamic NN classifier mask 800 is initialized with the same floating point value (0.5) for each mask weight of initialized dynamic NN classifier mask 800. However, as discussed such values may be generated using any suitable technique or techniques such as a random value for each mask weight of initialized dynamic NN classifier mask 800 being determined within a range of 0.15 to 0.85, inclusive.

Returning to FIG. 7, processing continues at operation 704, where the floating point values initialized at operation 703 are adapted to trained floating point valued based on training the dynamic NN classifier mask as implemented on the static NN classifier using the post-deployment training data. The adaptive training may be performed using any suitable technique or techniques such as back propagation techniques. For example, at each of a plurality of training iterations, the current dynamic NN classifier mask may be combined with the static NN classifier (e.g., using element wise multiplication) and implemented on a current portion of the training data, loss gradients may be determined, the mask may be updated, and so on until training is complete. Alternatively, the static NN classifier may be dynamically trained using similar techniques to generate resultant dynamic weights and the values of the dynamic NN classifier mask may be backed out by dividing the resultant dynamic weights by the static weights. In any event, operation 704 determines trained floating point values based on the received post-deployment training data. Furthermore, operation 704 may implement a user defined or predetermined learning rate that may adjust the aggressiveness of training of the dynamic NN classifier mask.

Processing continues at operation 705, where the trained floating point values are thresholded to a dynamic neural network language classifier mask. In the illustrated embodiment, the trained floating point values are thresholded to a binary dynamic neural network language classifier mask. In such embodiments, trained floating point values that compare favorably to a particular threshold, TH, are thresholded to values of 1 and indicate the corresponding static NN weight will pass through unchanged in the dynamic neural network language classifier and trained floating point values that compare unfavorably to the threshold are thresholded to values of 0 and indicate the corresponding static NN weight will be zeroed out in the dynamic neural network language classifier. The threshold value, TH, may be any suitable value such as a value of 0.5 or 0.4. In particular, values less than 0.5 may advantageously limit over correction in the resultant dynamic neural network language classifier.

In other embodiments, the trained floating point values are thresholded to a dynamic neural network language classifier mask having four available values. For example, the thresholding performed at operation 705 may generate four types of mask indicators: a first indicating corresponding static NN weight are to be zeroed out (e.g., those trained floating point values less than TH1), a second indicating corresponding static NN weight are to be multiplied by a first factor (e.g., those trained floating point values between TH1 and TH2, greater than TH1), a third indicating corresponding static NN weight are to be multiplied by a second factor greater than the first factor (e.g., those trained floating point values between TH2 and TH3, greater than TH2), and a third indicating corresponding static NN weight are passed through without change (e.g., those trained floating point values greater than TH3). Such embodiments may provide for finer tuning of the resultant dynamic neural network language classifier. Threshold values TH1, TH2, TH3 may be any suitable values such as 0.2, 0.4, and 0.6, respectively.

In some embodiments, process 700 ends at operation 705 and the resultant dynamic neural network language classifier mask is stored to memory for use as discussed herein. In other embodiments, characteristics of the dynamic neural network language classifier mask may be evaluated prior to acceptance of the mask.

For example, processing may continue at operation 706, where a number of zeroes in the mask (either a binary mask or a mask having four values) are counted. For example, the count may correspond to the number of static NN weights that are to be zeroed out in implementation of the dynamic neural network language classifier. Processing may then continue at decision operation 707, where a determination may be made as to whether the count of static NN weights to be zeroed out is within an acceptable range of a count of static NN weights to be zeroed out. The range may be any suitable range such as a range of 5% to 40% of a count of the total number of static NN weights. In other embodiments, the range may be 10% to 40% or 20% to 30% of the total number of static NN weights. In another embodiment, the count of static NN weights to be zeroed out is compared to a threshold (e.g., a threshold in the range of 5% to 40% of the total number of static NN weights) and the count is deemed acceptable if less than the threshold. Such techniques may mitigate over and/or under training of the dynamic neural network language classifier mask at a particular iteration. When decision operation 707 is satisfied, processing continues at operation 708, where the resultant mask is accepted. Otherwise, processing continues at operations 703-707 (e.g., the initializing, adapting, and thresholding are repeated until the count of mask indicators is within the range or a count of such repetitions meets a threshold). In such embodiments, at subsequent passes, the initialization technique is changed and/or the initialization values are modified such that a presumptive change in the resultant mask is attained.

The techniques discussed herein offer advantages of better adaptation results due to implicit regularization, reduced memory requirements (as compared to storing additional full models) to store an adapted model in addition to a static (e.g., storing a binary mask requires only one extra bit for each weight of the static NN), scalability as more models can be readily stored, and provision of model arbitration (e.g., interpolation) at much reduced memory and computation.

FIG. 9 illustrates exemplary pre-deployment and post-deployment training environments 900, arranged in accordance with at least some implementations of the present disclosure. As shown in FIG. 9, during a training phase 901, pre-deployment training data 902 is used to train a static NN model (M) 903. During an implementation phase 904, post-deployment training data 905 may be used to train another full NN model 906 (as illustrated by a circle having a hatched line) using a limited number of training data instances 907 in an adaptation direction 908. For example, static NN model 903 may be deployed initially having been trained on a large and varied pre-deployment training data 902 such that it performs well in a wide variety of conditions expected in operation. However, the actual conditions of operation may include a limited subset of or may be different from what production static NN model 903 was trained. In such contexts, full NN model 906 may be adapted to pre-deployment training data 902 representative of the particular local conditions for better performance and increased user satisfaction. However, such adaptation is difficult because it is performed on a limited amount of data collected and stored locally and, furthermore, it is desirable to retain static NN model 903 even though memory space on the implementing device. Notably, overtraining of NN model 906 and/or loss of static NN model 903 is undesirable.

Figure 10:
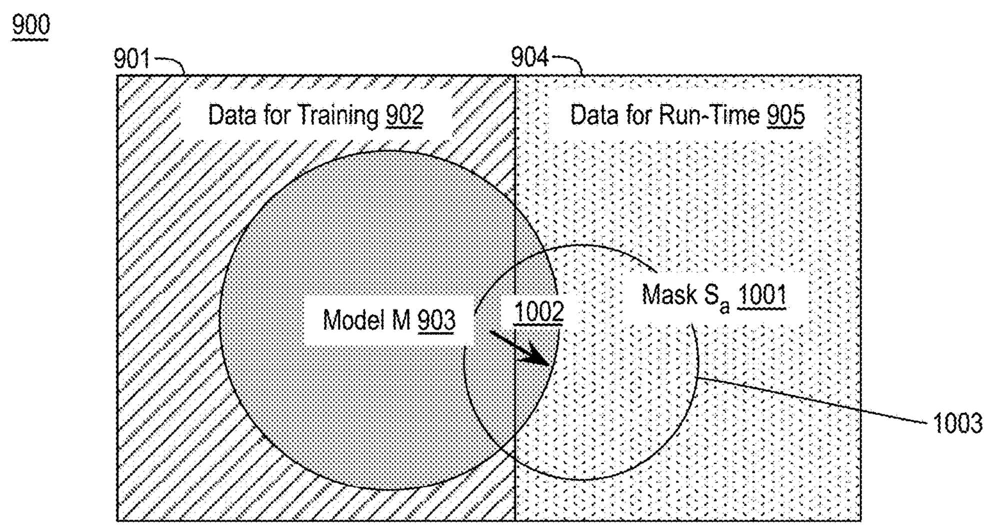
FIG. 10 illustrates exemplary pre-deployment and post-deployment training environments including a dynamic NN language classifier mask implementation.

FIG. 10 illustrates an exemplary pre-deployment and post-deployment training environment 900 including a dynamic NN language classifier mask 1001 implementation, arranged in accordance with at least some implementations of the present disclosure. As shown in FIG. 10, during implementation phase 904, dynamic NN language classifier mask 1001 is trained as discussed herein to move in an adaptation direction 1002 to generate, when combined with static NN model 903, a dynamic NN language model 1003 as discussed herein. Notably, the discussed techniques provide for dynamic NN language classifier mask 1001 that may modifies static NN model 903 to generate, at run-time dynamic NN language model 1003. Dynamic NN language classifier mask 1001 has a small memory footprint allowing both static NN model 903 and dynamic NN language model 1003 to be implemented in implementation phase 904.

Figure 11:
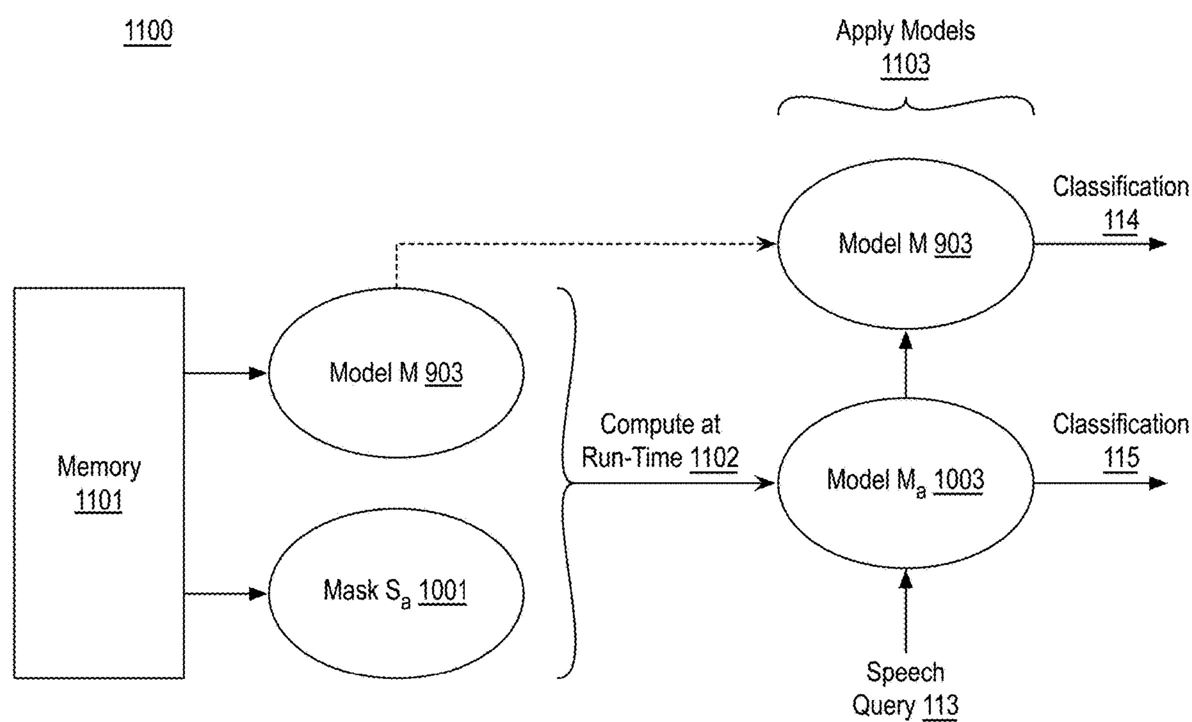
FIG. 11 illustrates an exemplary implementation of a static NN model and a dynamic NN model for memory savings.

FIG. 11 illustrates an exemplary implementation 1100 of a static NN model and a dynamic NN model for memory savings, arranged in accordance with at least some implementations of the present disclosure. As shown in FIG. 11, a system such as system 100 or any other system or device discussed herein may implement a memory 1101 that stores static NN model 903 (e.g., including the pre-trained static NN weights) and one or more dynamic NN language classifier masks 1001 (such as binary masks). As discussed, dynamic NN language classifier mask 1001 is trained during implementation and stored in memory 1101 along with static NN model 903. In an embodiment, static NN model 903 and dynamic NN language classifier mask 1001 are stored to memory 1101 such that static NN model 903 has a first memory storage size, dynamic NN language classifier mask 1001 has a second memory storage size, and a storage capacity of memory 1101 is greater than the sum of the first and second memory storage sizes but less than a storage factor multiplied by the first memory storage size. the storage factor may be any suitable factor such as 1.2 or 1.1 or the like and is representative of the memory savings provided by use of dynamic NN language classifier mask 1001 as opposed to multiple full NN models. Memory 1101 may be, for example, a memory dedicated for use in language understanding. Memory 1101 may be part of a larger memory footprint in a memory device or a dedicated memory component or module or a dedicated monolithic integrated circuit memory.

For example, assuming B bits are used for each model parameter (e.g., static pre-trained weight) of static NN model 903, such that B is typically 16 or 8, for a fully connected layer of a NN with n inputs and m outputs, the memory required to store the model parameters is $Bm(n+1)$ bits assuming mn weights and m biases. The corresponding memory needed to store dynamic NN language classifier mask 1001 is $1/B(1+1/n) \approx 1/B$ such that for a B value of 16, the memory needed to store dynamic NN language classifier mask 1001 is about 6% of the memory needed to store static NN model 903. For a B value of 8, the memory needed to store dynamic NN language classifier mask 1001 is about 12.5% of the memory needed to store static NN model 903. Thereby, the memory dedicated to store two NN language classifier models may be reduced from 2 times the memory needed to store static NN model 903 to 1.2 times the memory needed to store static NN model 903 (where 1.2 is the NN model storage factor) or even 1.13, 1.1, or 1.07 times the memory needed to store static NN model 903.

As shown in FIG. 11, static NN model 903 and dynamic NN language classifier mask 1001 are retrieved from memory 1101 at run time and a compute at run-time operation 1102 combines static NN model 903 and dynamic NN language classifier mask 1001 to generate dynamic NN language model 1003 as discussed herein using element-wise multiplication, masking operations, or the like. Then, static NN model 903 and dynamic NN language model 1003 are applied, as shown with respect to models application operation 1103, to speech query 113 to generate intent classifications 114, 115, respectively as discussed with respect to FIG. 1 herein. In some embodiments, static NN model 903 and dynamic NN language model 1003 are applied to speech query 113 at least partially in parallel such that the operations are concurrent. In some embodiments, application of static NN model 903 to speech query 113 and the generation, by combining static NN model 903 and dynamic NN language classifier mask 1001, of dynamic NN language model 1003 are performed at least in part concurrently.

Figure 12:
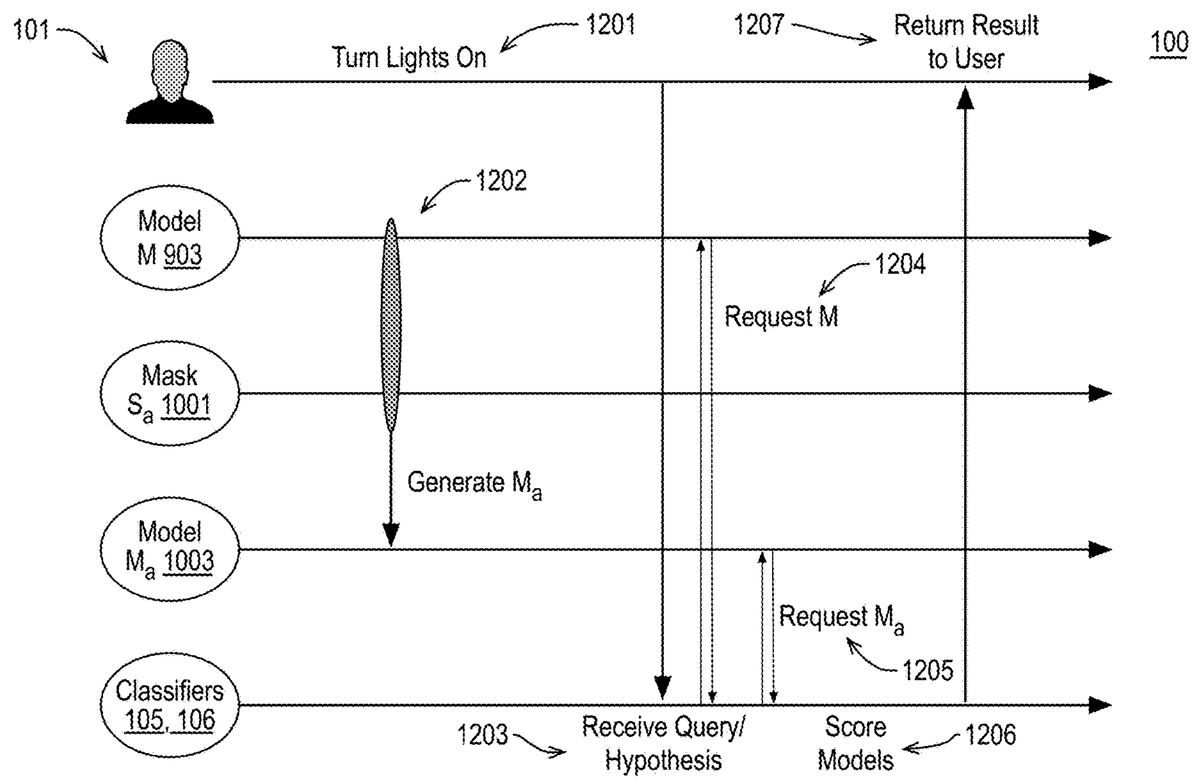
FIG. 12 illustrates an exemplary run-time timing diagram for implementation of static and dynamic NN models.

FIG. 12 illustrates an exemplary run-time timing diagram for implementation of static and dynamic NN models, arranged in accordance with at least some implementations of the present disclosure. As shown in FIG. 12, system 100 or any other device or system discussed herein may implement static and dynamic NN models 903, 1003, respectively. For example, user 101 may issue a command 1201 such as "turn the lights" or any other command for which they expect a response from system 100. In response to command 1201, system 100 may wake from a sleep state based on a wake on voice command or trigger and/or begin automatic speech recognition processing. As discussed, such processing may include generating a speech query using automatic speech recognition to generate a bag of words vectors or any other suitable feature vector or data structure for use in language classification. Furthermore, in response to the detection of command 1201 and the generation of such a speech query, dynamic NN language model 1003 is generated at combining operation 1202 by combining pre-deployment trained static NN model 903 and post-deployment trained or adapted dynamic NN language classifier mask 1001. As shown, static NN classifier 105 and dynamic NN classifier 106 receive the input speech query or hypothesis at operation 1203 and request from memory their corresponding static NN model 903 and dynamic NN model 1003 at request operations 1204, 1205, respectively. For example, static NN classifier 105 and dynamic NN classifier 106 may retrieve static NN model 903 from memory and generate dynamic NN model 1003 by further retrieving dynamic NN language classifier mask 1001 from memory and combining tit with static NN model 903.

Subsequently, static NN classifier 105 and dynamic NN classifier 106 score their respective static NN model 903 and dynamic NN model 1003 at scoring operation 1206 to generate corresponding intent classifications such that the classifications include most likely intents or all available intents for scoring and their corresponding probabilities. The resultant intent classifications are then used to generate a final intent and return a result to user 101 at output operation 1207. The resultant intent classification may be a weighted average of the two intent classifications, a most likely intent classification based on the weighted average, or a selected one of the intent classifications (e.g., based on meta data corresponding to the current input speech query). The result to user output operation 1207 may return the resultant intent, perform an action based on the resultant intent, issue a command based on the resultant intent, etc. After result to user output operation 1207, system100 may return to an idle state with respect to language understanding and the described processing may be repeated as needed with respect to commands issued by user 101.

Figure 13:
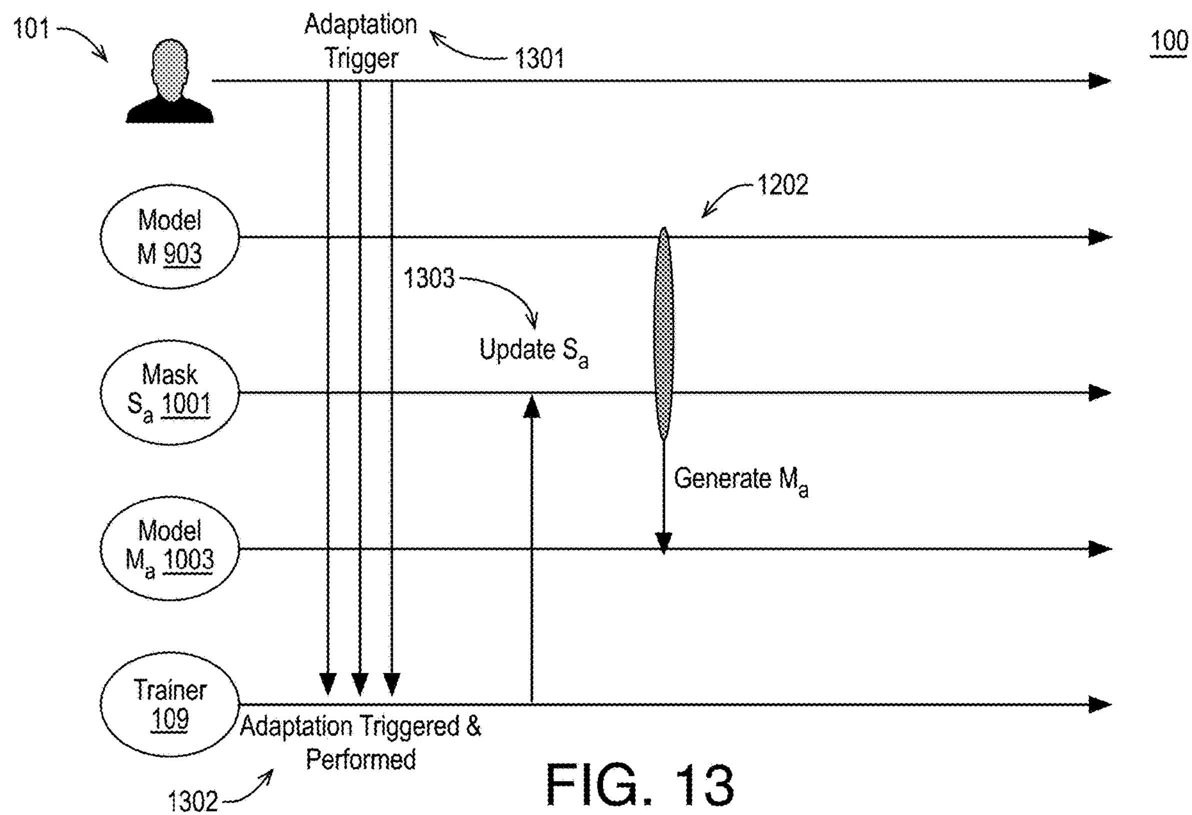
FIG. 13 illustrates an exemplary timing diagram for updating dynamic NN model masks.

FIG. 13 illustrates an exemplary timing diagram for updating dynamic NN model masks, arranged in accordance with at least some implementations of the present disclosure. As shown in FIG. 13, system 100 or any other device or system discussed herein may generate or adapt one or more new dynamic NN language classifier masks 1001 in response to adaptation triggers 1301. For example, adaptation triggers 1301 may be generated by system 100 or initiated by user 101. System 100 may generate adaptation triggers 1301 in response to a duration of time since the last adaptation, a number or rolling average of false intent classifications exceeding a threshold, a number of post-deployment training data instances attained since the last training exceeding a threshold, or the like.

As shown, in response to adaptation trigger 1301, dynamic NN mask trainer 109 retrieves static NN model 903 and training data attained post-deployment, and dynamic NN mask trainer 109 generates an update 1303 to dynamic NN language classifier mask 1001 as shown with respect to adaptation triggered and performed operation 1302. Newly generated or updated dynamic NN language classifier mask 1001 may replace a previous dynamic NN language classifier mask or multiple such masks may be stored for use.

After update and storage of updated dynamic NN language classifier mask 1001, processing continues with the original static NN model 903 and the one or more adapted dynamic NN language classifier masks 1001 as discussed above. For example, in response to a command, combining operation 1202 is performed, the single static NN model and two or more dynamic NN models are scored, and so on.

Figure 14:
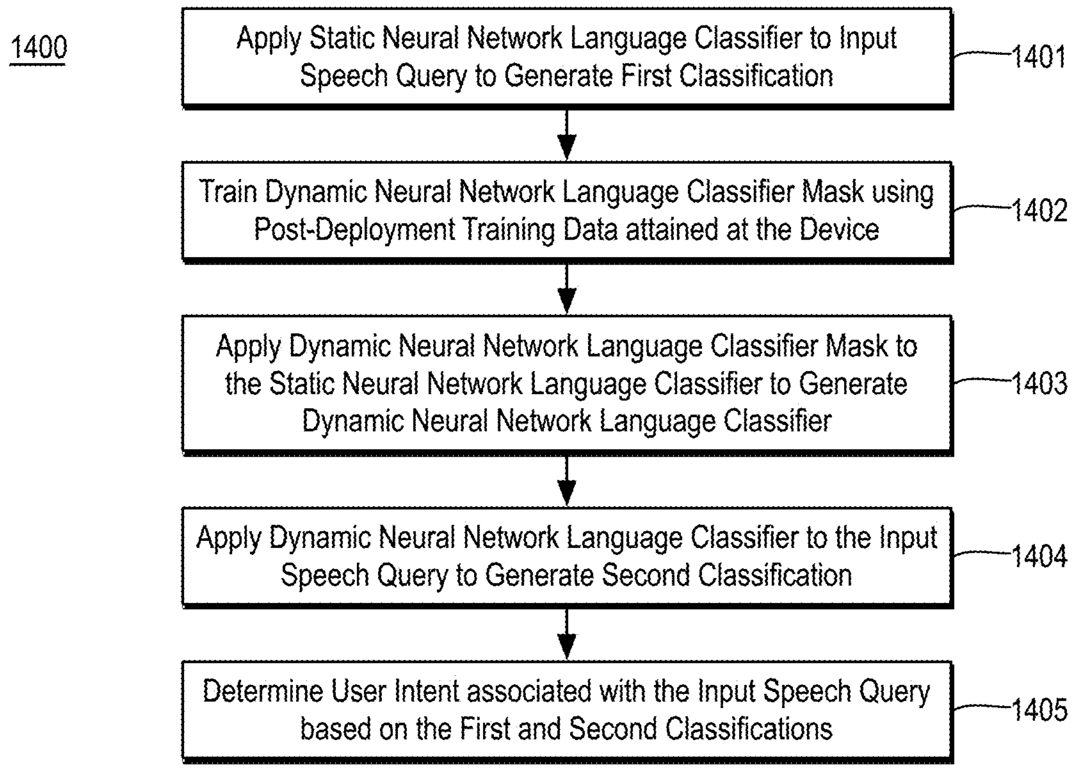
FIG. 14 is a flow diagram illustrating an example process for performing spoken language understanding.

FIG. 14 is a flow diagram illustrating an example process 1400 for performing spoken language understanding, arranged in accordance with at least some implementations of the present disclosure. Process 1400 may include one or more operations 1401-1405 as illustrated in FIG. 14. Process 1400 may form at least part of a spoken language understanding process performed, for example, by system 100. Furthermore, process 1400 will be described herein in reference to system 1500 of FIG. 15.

Figure 15:
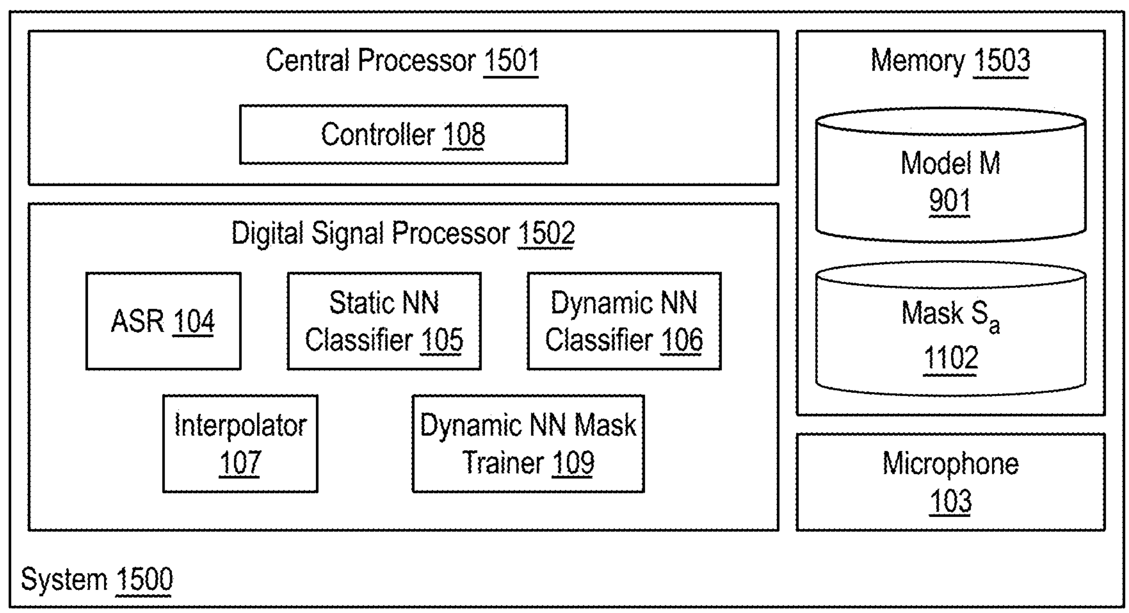
FIG. 15 is an illustrative diagram of an example system for performing spoken language understanding.

FIG. 15 is an illustrative diagram of an example system 1500 for performing spoken language understanding, arranged in accordance with at least some implementations of the present disclosure. As shown in FIG. 15, system 1500 may include a central processor 1501, a digital signal processor 1502, a memory 1503, and microphone 103. Also as shown, digital signal processor 1502 may include or implement automatic speech recognition module 104, static NN classifier 105, dynamic NN classifier 106, and dynamic NN mask trainer 109. In some embodiments, digital signal processor 1502 may also include or implement controller 108. Also as shown, memory 1503 may store static NN model 903 and dynamic NN language classifier mask 1001. Memory 1503 may also store audio data, input speech data, input speech queries, intent classifications, or any other data or data structures as discussed herein.

Although illustrated and discussed herein with respect to neural network language classifiers for the sake of clarity of presentation, the techniques discussed herein may be implemented using any static neural networks, dynamic neural networks, and dynamic neural network mask, etc. that may be applied to any input queries to generate any neural network outputs, etc. in any context. Therefore, any static neural network may be used in place of any static neural network language classifier, any dynamic neural network mask may be used in place of any dynamic neural network language classifier mask, any dynamic neural network may be used in place of any dynamic neural network language classifier herein, etc.

Central processor 1501 and digital signal processor 1502 may include any number and type of processing units that may provide the operations as discussed herein. Such operations may be implemented via software or hardware or a combination thereof. For example, digital signal processor 1502 may include circuitry dedicated to manipulate data obtained from memory 1503 or dedicated memory. Furthermore, central processor 1501 may include any number and type of processing units or modules that may provide control and other high level functions for system 1500 as well as the operations as discussed herein. In the illustrated example, system 1500 may be configured to perform language understanding.

Memory 1503 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1503 may be implemented by cache memory. As shown, in an embodiment, digital signal processor 1502 may include or implement automatic speech recognition module 104, static NN classifier 105, dynamic NN classifier 106, and dynamic NN mask trainer 109 are implemented via digital signal processor 1502. In another embodiment, digital signal processor 1502 may include or implement automatic speech recognition module 104, static NN classifier 105, dynamic NN classifier 106, and dynamic NN mask trainer 109 are implemented via central processor 1501. In other embodiments, all or some or portions of digital signal processor 1502 may include or implement automatic speech recognition module 104, static NN classifier 105, dynamic NN classifier 106, and dynamic NN mask trainer 109 are implemented via an execution unit (EU). The EU may include, for example, programmable logic or circuitry such as a logic core or cores that may provide a wide array of programmable logic functions. In an embodiment, digital signal processor 1502 and memory 1503 may be provided or implemented as a system on a chip.

Returning to discussion of FIG. 14, process 1400 begins at operation 1401, where a static neural network language classifier is applied to an input speech query to generate a first intent classification by applying of pre-trained weights of the static neural network language classifier trained using pre-deployment training data. The static neural network language classifier may be any suitable static neural network language classifier. In some embodiments, the static neural network language classifier is one of a multilayer perceptron neural network, a feed forward neural network, or a radial based feed forward neural network. The input speech query may be in any suitable data structure for implementation of a neural network language classifier. In an embodiment, the input speech query is a bag of words vector representative of received audio data.

Processing continues at operation 1402, where a dynamic neural network language classifier mask is trained based on post-deployment training data attained at the device such that the dynamic neural network language classifier mask includes mask indicators to set corresponding pre-trained weights of the static neural network language classifier to zero during implementation of a dynamic neural network language classifier. Notably, the dynamic neural network language classifier mask may also include mask indicators to pass through corresponding pre-trained weights of the static neural network language classifier. Furthermore, the dynamic neural network language classifier mask training may be before application of the static neural network language classifier performed at operation 1401. As discussed herein, a pre-training data set used to pre-train the static neural network language classifier is unavailable during operation 1401 and the post-deployment training data used at operation 1401 includes second input speech queries and corresponding known user intents attained at the device implementing process 1400.

In some embodiments, training the dynamic neural network language classifier mask includes initializing floating point values of the dynamic neural network language classifier mask, adapting the initialized floating point values of the dynamic neural network language classifier mask to trained floating point values based on the post-deployment training data, and thresholding the trained floating point values to generate the mask indicators. In an embodiment, said thresholding comprises assigning the mask indicators when a corresponding trained floating point value is less than a threshold, the threshold being not greater than 0.4. In an embodiment, said thresholding further generates second mask indicators, third mask indicators, and fourth mask indicators to set, in the dynamic neural network language classifier, corresponding pre-trained weights to a first fraction of the weight, a second fraction, greater than the first fraction, of the weight, and to the weight itself, respectively. In an embodiment, initializing the floating point values of the dynamic neural network language classifier mask comprises randomly assigning the floating point values in a range of 0.15 to 0.85, inclusive. In an embodiment, adapting the initialized floating point values comprises back propagation based on loss gradients derived with respect to the floating point values of the dynamic neural network language classifier mask.

In some embodiments, training the dynamic neural network language classifier mask includes initializing floating point values of the dynamic neural network language classifier mask, adapting the initialized floating point values of the dynamic neural network language classifier mask to trained floating point values based on the post-deployment training data, thresholding the trained floating point values to generate a first set of mask indicators, comparing a count of the first set of mask indicators to an acceptable range of a count of mask indicators, and when the count of the first set of mask indicators is within the range, using the first set of mask indicators as the plurality of mask indicators, and when the count of the first set of mask indicators is not within the range, discarding the first set of mask indicators and repeating said initializing, adapting, and thresholding until the count of mask indicators is within the range. In an embodiment, the range extends from not less than 5% and not more than 40% of a count of the pre-trained weights of the static neural network language classifier.

In some embodiments, process 1400 further includes generating a dynamic neural network language classifier mask training trigger based on one or more of a duration since a last training, a number of false input speech query classifications since the last training, or a number of post-deployment training data instances attained since the last training, wherein said training the dynamic neural network language classifier mask is in response to the trigger.

Processing continues at operation 1403, where the dynamic neural network language classifier mask is applied to the static neural network language classifier to generate a dynamic neural network language classifier such that the dynamic neural network language classifier includes a plurality of zero weights corresponding to the plurality of mask indicators and a plurality of weights matching the pre-trained weights. The dynamic neural network language classifier mask may be generated using any suitable technique or techniques such as element-wise multiplication of the dynamic neural network language classifier mask and the static neural network language classifier.

Processing continues at operation 1404, where the dynamic neural network language classifier is applied to the input speech query to generate a second intent classification. The first and second intent classifications may have the same data structures including, for example, a probability for each available intent (e.g., each intent that can be scored), a probability for a particular number of most likely intents, etc.

Processing continues at operation 1405, where a user intent associated with the input speech query is determined based on the first and second intent classifications of the input speech query. The user intent may be determined using any suitable technique or techniques such as weighted averaging the first and second intent classifications and outputting a resultant intent having a highest weighted average. The user intent may be any suitable data structure. In an embodiment, the user intent is an intended operation of the device. In some embodiments, process 1400 further includes storing the static neural network language classifier and the dynamic neural network language classifier mask to a memory of a device such that the static neural network language classifier has a first memory storage size, the dynamic neural network language classifier mask has a second memory storage size, and a storage capacity of the memory of the device is greater than the sum of the first and second memory storage sizes but less than 1.2 times the first memory storage size. For example, the memory may be a language classifier dedicated memory of a device implementing process 1400.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 16:
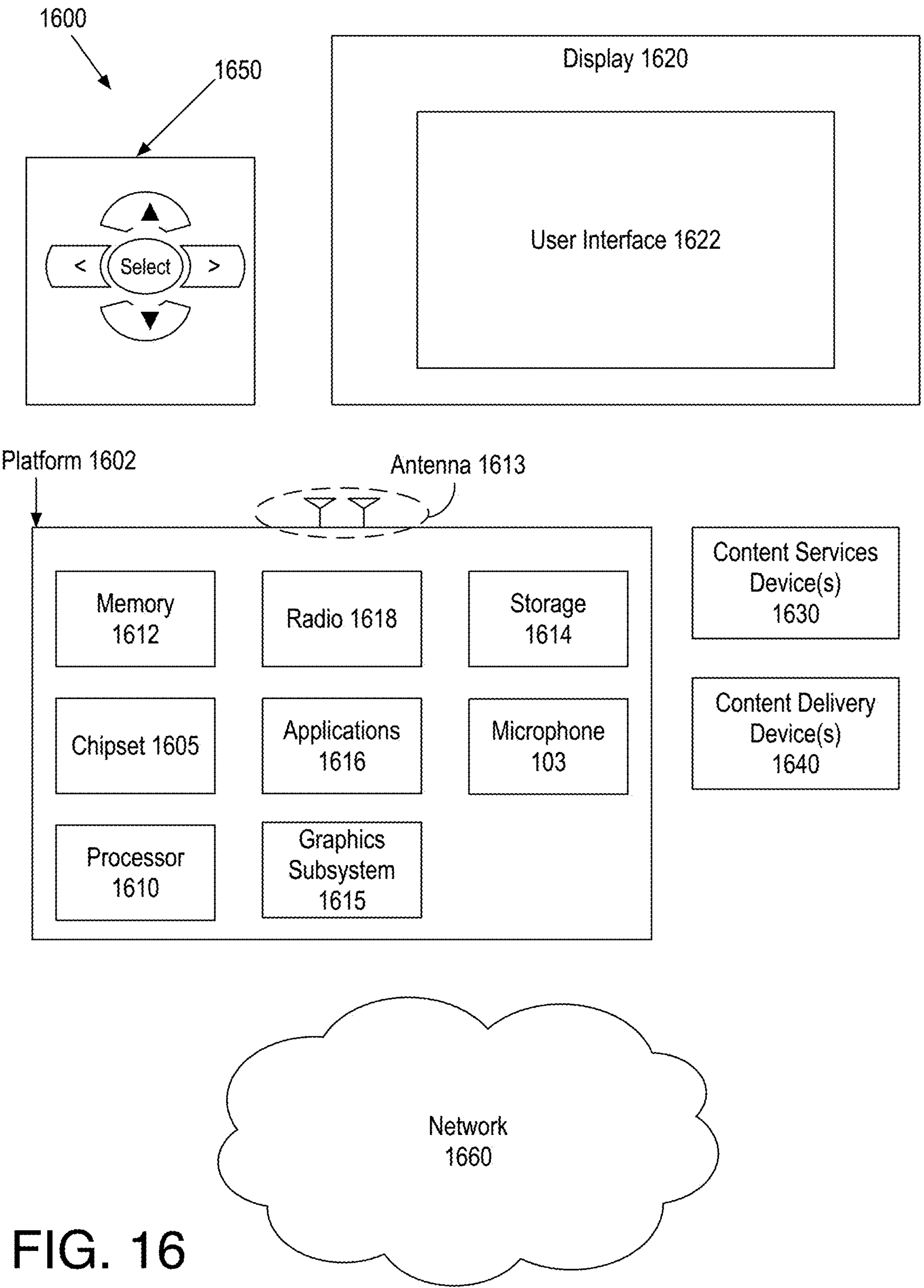
FIG. 16 is an illustrative diagram of an example system.

FIG. 16 is an illustrative diagram of an example system 1600, arranged in accordance with at least some implementations of the present disclosure. In various implementations, system 1600 may be a media system although system 1600 is not limited to this context. For example, system 1600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, cameras (e.g. point-and-shoot cameras, super-zoom cameras, digital single-lens reflex (DSLR) cameras), and so forth.

In various implementations, system 1600 includes a platform 1602 coupled to a display 1620. Platform 1602 may receive content from a content device such as content services device(s) 1630 or content delivery device(s) 1640 or other similar content sources. As shown, in some examples, system 1600 may include microphone 103 implemented via platform 1602. Platform 1602 may receive input speech via microphone 103 as discussed herein. A navigation controller 1650 including one or more navigation features may be used to interact with, for example, platform 1602 and/or display 1620. Each of these components is described in greater detail below.

In various implementations, system 1600 may provide key phrase detection as described. For example, key phrase detection may be provide wake on voice capability for a device or environment as described. In other implementations, system 1600 may provide for generating a key phrase detection model (e.g., including an acoustic model, a rejection model, and a key phrase model). Such training may be performed offline prior to key phrase detection for example.

In various implementations, platform 1602 may include any combination of a chipset 1605, processor 1610, memory 1612, antenna 1613, storage 1614, graphics subsystem 1615, applications 1616 and/or radio 1618. Chipset 1605 may provide intercommunication among processor 1610, memory 1612, storage 1614, graphics subsystem 1615, applications 1616 and/or radio 1618. For example, chipset 1605 may include a storage adapter (not depicted) capable of providing intercommunication with storage 1614.

Processor 1610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1610 may be dual-core processor(s), dual-core mobile processor(s), and so forth.

Memory 1612 may be implemented as a volatile memory device such as, but not limited to, a Random Access Memory (RAM), Dynamic Random Access Memory (DRAM), or Static RAM (SRAM).

Storage 1614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1614 may include technology to increase the storage performance enhanced protection for valuable digital media when multiple hard drives are included, for example.

Graphics subsystem 1615 may perform processing of images such as still or video for display. Graphics subsystem 1615 may be a graphics processing unit (GPU) or a visual processing unit (VPU), for example. An analog or digital interface may be used to communicatively couple graphics subsystem 1615 and display 1620. For example, the interface may be any of a High-Definition Multimedia Interface, DisplayPort, wireless HDMI, and/or wireless HD compliant techniques. Graphics subsystem 1615 may be integrated into processor 1610 or chipset 1615. In some implementations, graphics subsystem 1615 may be a stand-alone device communicatively coupled to chipset 1605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1618 may operate in accordance with one or more applicable standards in any version.

In various implementations, display 1620 may include any television type monitor or display. Display 1620 may include, for example, a computer display screen, touch screen display, video monitor, television-like device, and/or a television. Display 1620 may be digital and/or analog. In various implementations, display 1620 may be a holographic display. Also, display 1620 may be a transparent surface that may receive a visual projection. Such projections may convey various forms of information, images, and/or objects. For example, such projections may be a visual overlay for a mobile augmented reality (MAR) application. Under the control of one or more software applications 1616, platform 1602 may display user interface 1622 on display 1620.

In various implementations, content services device(s) 1630 may be hosted by any national, international and/or independent service and thus accessible to platform 1602 via the Internet, for example. Content services device(s) 1630 may be coupled to platform 1602 and/or to display 1620. Platform 1602 and/or content services device(s) 1630 may be coupled to a network 1660 to communicate (e.g., send and/or receive) media information to and from network 1660. Content delivery device(s) 1640 also may be coupled to platform 1602 and/or to display 1620.

In various implementations, content services device(s) 1630 may include a cable television box, personal computer, network, telephone, Internet enabled devices or appliance capable of delivering digital information and/or content, and any other similar device capable of uni-directionally or bi-directionally communicating content between content providers and platform 1602 and/display 1620, via network 1660 or directly. It will be appreciated that the content may be communicated uni-directionally and/or bi-directionally to and from any one of the components in system 1600 and a content provider via network 1660. Examples of content may include any media information including, for example, video, music, medical and gaming information, and so forth.

Content services device(s) 1630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1602 may receive control signals from navigation controller 1650 having one or more navigation features. The navigation features of controller 1650 may be used to interact with user interface 1622, for example. In various embodiments, navigation controller 1650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1650 may be replicated on a display (e.g., display 1620) by movements of a pointer, cursor, focus ring, or other visual indicators displayed on the display. For example, under the control of software applications 1616, the navigation features located on navigation controller 1650 may be mapped to virtual navigation features displayed on user interface 1622, for example. In various embodiments, controller 1650 may not be a separate component but may be integrated into platform 1602 and/or display 1620. The present disclosure, however, is not limited to the elements or in the context shown or described herein.

In various implementations, drivers (not shown) may include technology to enable users to instantly turn on and off platform 1602 like a television with the touch of a button after initial boot-up, when enabled, for example. Program logic may allow platform 1602 to stream content to media adaptors or other content services device(s) 1630 or content delivery device(s) 1640 even when the platform is turned "off." In addition, chipset 1605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1600 may be integrated. For example, platform 1602 and content services device(s) 1630 may be integrated, or platform 1602 and content delivery device(s) 1640 may be integrated, or platform 1602, content services device(s) 1630, and content delivery device(s) 1640 may be integrated, for example. In various embodiments, platform 1602 and display 1620 may be an integrated unit. Display 1620 and content service device(s) 1630 may be integrated, or display 1620 and content delivery device(s) 1640 may be integrated, for example. These examples are not meant to limit the present disclosure.

In various embodiments, system 1600 may be implemented as a wireless system, a wired system, or a combination of both. When implemented as a wireless system, system 1600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 16.

Figure 17:
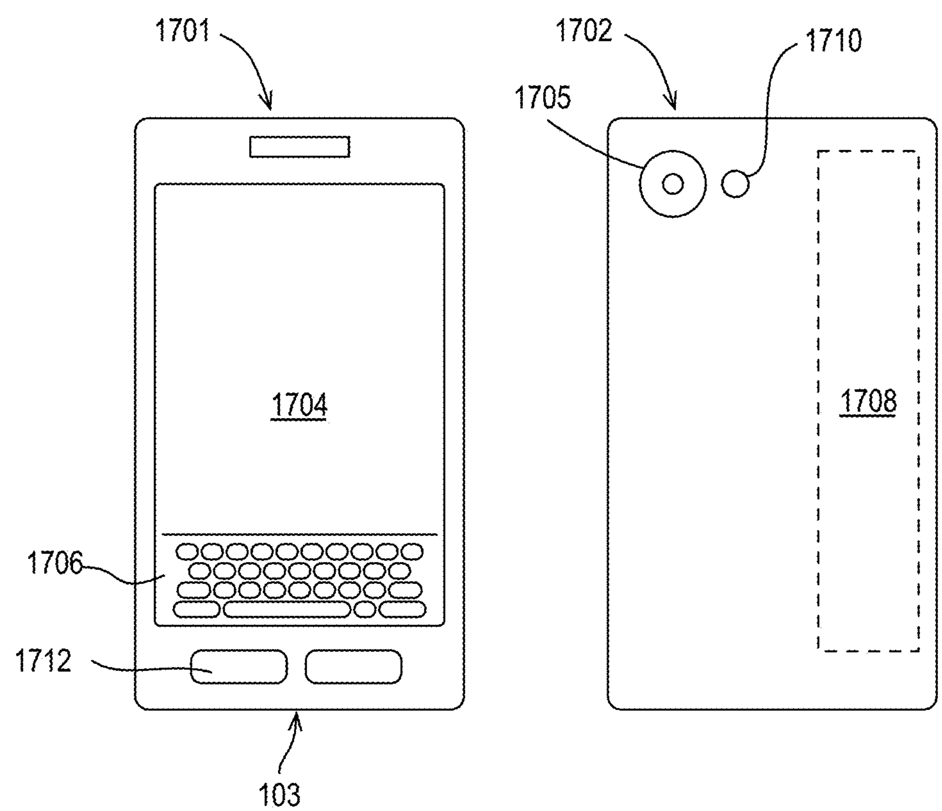
FIG. 17 illustrates an example device, all arranged in accordance with at least some implementations of the present disclosure.

As described above, system 1600 may be embodied in varying physical styles or form factors. FIG. 17 illustrates implementations of a small form factor device, arranged in accordance with at least some implementations of the present disclosure. In some examples, system 1600 may be implemented via device 1700. In other examples, other devices or systems, or portions thereof may be implemented via device 1700. In various embodiments, for example, device 1700 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 17, device 1700 may include a housing with a front 1701 and a back 1702. Device 1700 includes a display 1704, an input/output (I/O) device 1706, and an integrated antenna 1708. Device 1700 also may include navigation features 1712. I/O device 1706 may include any suitable I/O device for entering information into a mobile computing device. Examples for I/O device 1706 may include an alphanumeric keyboard, a numeric keypad, a touch pad, input keys, buttons, switches, microphones, speakers, voice recognition device and software, and so forth. Information also may be entered into device 1700 by way of microphone 103, or may be digitized by a voice recognition device. As shown, device 1700 may include a camera 1705 (e.g., including a lens, an aperture, and an imaging sensor) and a flash 1710 integrated into back 1702 (or elsewhere) of device 1700.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method comprises applying a static neural network to an input query to generate a first output by application of a plurality of pre-trained weights of the static neural network trained using pre-deployment training data, training a dynamic neural network mask based on post-deployment training data attained at the device, the dynamic neural network mask comprising a plurality of mask indicators to set corresponding pre-trained weights to zero, applying the dynamic neural network mask to the static neural network to generate a dynamic neural network, wherein the dynamic neural network comprises a plurality of zero weights corresponding to the plurality of mask indicators and a plurality of weights matching the pre-trained weights, applying the dynamic neural network to the input speech query to generate a second output, and determining a final output associated with the input query based on the first and second outputs.

In one or more second embodiments, further to the first embodiments, the static neural network comprises a static neural network language classifier, the dynamic neural network mask comprises a dynamic neural network language classifier mask, the input query comprises an input speech query, the first and second outputs comprise first and second intent classifications, and the final output comprises a a user intent associated with the input speech query.

In one or more third embodiments, further to the first or second embodiments, a pre-training data set used to pre-train the static neural network is unavailable to the device and the post-deployment training data comprises a second input query and a corresponding known user intent both attained at the device.

In one or more fourth embodiments, further to the first through third embodiments, training the dynamic neural mask comprises initializing floating point values of the dynamic neural network mask, adapting the initialized floating point values of the dynamic neural network mask to trained floating point values based on the post-deployment training data, and thresholding the trained floating point values to generate the mask indicators.

In one or more fifth embodiments, further to the first through fourth embodiments, the thresholding comprises assigning the mask indicators when a corresponding trained floating point value is less than a threshold, the threshold being not greater than 0.4.

In one or more sixth embodiments, further to the first through fifth embodiments, said thresholding further generates second mask indicators, third mask indicators, and fourth mask indicators to set, in the dynamic neural network, corresponding pre-trained weights to a first fraction of the weight, a second fraction, greater than the first fraction, of the weight, and to the weight itself, respectively.

In one or more seventh embodiments, further to the first through sixth embodiments, initializing the floating point values of the dynamic neural network mask comprises randomly assigning the floating point values in a range of 0.15 to 0.85, inclusive.

In one or more eighth embodiments, further to the first through seventh embodiments, adapting the initialized floating point values comprises back propagation based on loss gradients derived with respect to the floating point values of the dynamic neural network mask.

In one or more ninth embodiments, further to the first through eighth embodiments, training the dynamic neural network mask comprises initializing floating point values of the dynamic neural network mask, adapting the initialized floating point values of the dynamic neural network mask to trained floating point values based on the post-deployment training data, thresholding the trained floating point values to generate a first set of mask indicators, comparing a count of the first set of mask indicators to an acceptable range of a count of mask indicators, and when the count of the first set of mask indicators is within the range, using the first set of mask indicators as the plurality of mask indicators and when the count of the first set of mask indicators is not within the range, discarding the first set of mask indicators and repeating said initializing, adapting, and thresholding until the count of mask indicators is within the range.

In one or more tenth embodiments, further to the first through ninth embodiments, the range extends from not less than 5% and not more than 40% of a count of the pre-trained weights of the static neural network.

In one or more eleventh embodiments, further to the first through tenth embodiments, the method further comprises storing the static neural network and the dynamic neural network mask to memory, wherein the static neural network has a first memory storage size, the dynamic neural network mask has a second memory storage size, and a storage capacity of the memory of the device is greater than the sum of the first and second memory storage sizes but less than 1.2 times the first memory storage size.

In one or more twelfth embodiments, further to the first through eleventh embodiments, the method further comprises generating a dynamic neural network mask training trigger based on one or more of a duration since a last training, a number of false input query classifications since the last training, or a number of post-deployment training data instances attained since the last training, wherein training the dynamic neural network mask is in response to the trigger.

In one or more thirteenth embodiments, further to the first through twelfth embodiments, the static neural network comprises one of a multilayer perceptron neural network, a feed forward neural network, a recurrent neuronal network, a convolutional neuronal network, or a radial based feed forward neural network, the input query comprises a bag of words vector representative of received audio data, and the final output comprises an intended operation of the device.

In one or more fourteenth embodiments, a device or system includes a memory and a processor to perform a method according to any one of the above embodiments.

In one or more fifteenth embodiments, at least one machine readable medium includes a plurality of instructions that in response to being executed on a computing device, cause the computing device to perform a method according to any one of the above embodiments.

In one or more sixteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device comprising:

a memory to store a static neural network and a dynamic neural network mask; and one or more processors coupled to the memory, the one or more processors to:

apply the static neural network to an input query to generate a first output by application of a plurality of pre-trained weights of the static neural network trained using pre-deployment training data;

train the dynamic neural network mask based on post-deployment training data attained at the device by the one or more processors to initialize values of the dynamic neural network mask, adapt the initialized values to trained values based on the post-deployment training data, threshold the trained values to generate a first set of mask indicators, compare a count of the first set of mask indicators to a range of a count of mask indicators, and when the count of the first set of mask indicators is within the range, use the first set of mask indicators as a plurality of mask indicators and when the count of the first set of mask indicators is not within the range, discard the first set of mask indicators and repeat said initialize, adapt, and threshold operations until the count of mask indicators is within the range, wherein the dynamic neural network mask comprises the plurality of mask indicators to set corresponding pre-trained weights to zero;

apply the dynamic neural network mask to the static neural network to generate a dynamic neural network, wherein the dynamic neural network comprises a plurality of zero weights corresponding to the plurality of mask indicators and a plurality of weights matching the pre-trained weights;

apply the dynamic neural network to the input query to generate a second output; and determine a final output associated with the input query based on the first and second outputs.

2. The device of claim 1, wherein the static neural network comprises a static neural network language classifier, the dynamic neural network mask comprises a dynamic neural network language classifier mask, the input query comprises an input speech query, the first and second outputs comprise first and second intent classifications, and the final output comprises a user intent associated with the input speech query.

3. The device of claim 1, wherein a pre-training data set used to pre-train the static neural network is unavailable to the device and the post-deployment training data comprises a second input query and a corresponding known user intent both attained at the device.

4. The device of claim 1, wherein the one or more processors to threshold comprises the one or more processors to assign the mask indicators when a corresponding trained value is less than a threshold, the threshold being not greater than 0.4.

5. The device of claim 1, wherein the one or more processors to threshold further generates second mask indicators and third mask indicators to set, in the dynamic neural network, corresponding pre-trained weights to a first fraction of the weight and a second fraction, greater than the first fraction, of the weight, respectively.

6. The device of claim 1, wherein the one or more processors to initialize the values of the dynamic neural network mask comprises the one or more processors to randomly assign the values in a pre-defined range of 0.15 to 0.85, inclusive.

7. The device of claim 1, wherein the initialized values and the trained values are floating point values.

8. The device of claim 1, wherein the range extends from not less than 5% and not more than 40% of a count of the pre-trained weights of the static neural network.

9. The device of claim 1, further comprising the one or more processors to:

store the static neural network and the dynamic neural network mask to the memory, wherein the static neural network has a first memory storage size, the dynamic neural network mask has a second memory storage size, and a storage capacity of the memory of the device is greater than the sum of the first and second memory storage sizes but less than 1.2 times the first memory storage size.

10. The device of claim 1, the one or more processors to:

generate a dynamic neural network mask training trigger based on one or more of a duration since a last training, a number of false input query classifications since the last training, or a number of post-deployment training data instances attained since the last training, wherein the processor to train the dynamic neural network mask is in response to the trigger.

11. The device of claim 1, wherein the static neural network comprises one of a multilayer perceptron neural network, a feed forward neural network, a recurrent neuronal network, a convolutional neuronal network, or a radial based feed forward neural network, the input query comprises a bag of words vector representative of received audio data, and the final output comprises an intended operation of the device.

12. A processor-implemented method comprising:

applying a static neural network to an input query to generate a first output by application of a plurality of pre-trained weights of the static neural network trained using pre-deployment training data;

training a dynamic neural network mask based on post-deployment training data attained at the device by initializing values of the dynamic neural network mask, adapting the initialized values to trained values based on the post-deployment training data, thresholding the trained values to generate a first set of mask indicators, comparing a count of the first set of mask indicators to a range of a count of mask indicators, and when the count of the first set of mask indicators is within the range, using the first set of mask indicators as a plurality of mask indicators, and when the count of the first set of mask indicators is not within the range, discarding the first set of mask indicators and repeating said initializing, adapting, and thresholding until the count of mask indicators is within the range, wherein the dynamic neural network mask comprises the plurality of mask indicators to set corresponding pre-trained weights to zero;

applying the dynamic neural network mask to the static neural network to generate a dynamic neural network, wherein the dynamic neural network comprises a plurality of zero weights corresponding to the plurality of mask indicators and a plurality of weights matching the pre-trained weights;

applying the dynamic neural network to the input query to generate a second output; and determining a final output associated with the input query based on the first and second outputs.

13. The method of claim 12, wherein the static neural network comprises a static neural network language classifier, the dynamic neural network mask comprises a dynamic neural network language classifier mask, the input query comprises an input speech query, the first and second outputs comprise first and second intent classifications, and the final output comprises a user intent associated with the input speech query.

14. The method of claim 12, wherein said thresholding further generates second mask indicators and third mask indicators to set, in the dynamic neural network, corresponding pre-trained weights to a first fraction of the weight and a second fraction, greater than the first fraction, of the weight, respectively.

15. The method of claim 12, wherein initializing the values of the dynamic neural network mask comprises randomly assigning the values in a range of 0.15 to 0.85, inclusive.

16. The method of claim 12, wherein the initialized values and the trained values are floating point values.

17. The method of claim 12, wherein the initialized values and the trained values are floating point values and the range extends from not less than 5% and not more than 40% of a count of the pre-trained weights of the static neural network.

18. At least one non-transitory machine readable medium comprising a plurality of instructions that, in response to being executed on a device, cause the device to evaluate an input query by:

applying a static neural network to the input query to generate a first output by application of a plurality of pre-trained weights of the static neural network trained using pre-deployment training data;

training a dynamic neural network mask based on post-deployment training data attained at the device by initializing values of the dynamic neural network mask, adapting the initialized values to trained values based on the post-deployment training data, thresholding the trained values to generate a first set of mask indicators, comparing a count of the first set of mask indicators to a range of a count of mask indicators, and when the count of the first set of mask indicators is within the range, using the first set of mask indicators as a plurality of mask indicators, and when the count of the first set of mask indicators is not within the range, discarding the first set of mask indicators and repeating said initializing, adapting, and thresholding until the count of mask indicators is within the range, wherein the dynamic neural network mask comprises the plurality of mask indicators to set corresponding pre-trained weights to zero;

applying the dynamic neural network mask to the static neural network to generate a dynamic neural network, wherein the dynamic neural network comprises a plurality of zero weights corresponding to the plurality of mask indicators and a plurality of weights matching the pre-trained weights;

applying the dynamic neural network to the input query to generate a second output; and determining a final output associated with the input query based on the first and second outputs.

19. The non-transitory machine readable medium of claim 18, wherein the static neural network comprises a static neural network language classifier, the dynamic neural network mask comprises a dynamic neural network language classifier mask, the input query comprises an input speech query, the first and second outputs comprise first and second intent classifications, and the final output comprises a user intent associated with the input speech query.

20. The non-transitory machine readable medium of claim 18, wherein said thresholding further generates second mask indicators and third mask indicators to set, in the dynamic neural network, corresponding pre-trained weights to a first fraction of the weight and a second fraction, greater than the first fraction, of the weight, respectively.

21. The non-transitory machine readable medium of claim 18, wherein initializing the values of the dynamic neural network mask comprises randomly assigning the values in a range of 0.15 to 0.85, inclusive.

22. The non-transitory machine readable medium of claim 18, wherein the initialized values and the trained values are floating point values.

23. The non-transitory machine readable medium of claim 18, wherein the initialized values and the trained values are floating point values and the range extends from not less than 5% and not more than 40% of a count of the pre-trained weights of the static neural network.

* * * * *